US011684090B2

(12) United States Patent
Mah et al.

(10) Patent No.: US 11,684,090 B2
(45) Date of Patent: Jun. 27, 2023

(54) MACHINE FOR LASER ETCHING AND TAG WRITING A VAPORIZER CARTRIDGE

(71) Applicant: JUUL Labs, Inc., Washington, DC (US)

(72) Inventors: Andy Mah, Oakland, CA (US); Timothy Roger Milberger, Sacramento, CA (US); Darin Parnell Smedberg, Pollock Pines, CA (US); Marko Markovic, San Francisco, CA (US); Todd Farr, San Francisco, CA (US)

(73) Assignee: JUUL Labs, Inc., Washington, DC (US)

( * ) Notice: Subject to any disclaimer, the term of this patent is extended or adjusted under 35 U.S.C. 154(b) by 0 days.

(21) Appl. No.: 17/096,599

(22) Filed: Nov. 12, 2020

(65) Prior Publication Data

US 2021/0145077 A1    May 20, 2021

Related U.S. Application Data

(60) Provisional application No. 62/936,362, filed on Nov. 15, 2019.

(51) Int. Cl.
*A24F 40/70* (2020.01)
*A24F 40/65* (2020.01)
(Continued)

(52) U.S. Cl.
CPC .............. *A24F 40/70* (2020.01); *A24F 40/42* (2020.01); *A24F 40/65* (2020.01); *B23K 26/083* (2013.01);
(Continued)

(58) Field of Classification Search
CPC .......... A24F 40/40; A24F 40/42; A24F 40/80; A24F 40/00; A24F 40/70; A24F 40/65;
(Continued)

(56) References Cited

U.S. PATENT DOCUMENTS 5,477,023 A * 12/1995 Schneider .............. G21C 17/00
                                                    219/121.11
5,610,635 A    3/1997 Murray et al.
(Continued)

FOREIGN PATENT DOCUMENTS

AU    2017202891         5/2019
DE    102014215444 A1    2/2016
(Continued)

*Primary Examiner* — Daniel I Walsh
(74) *Attorney, Agent, or Firm* — Mintz, Levin, Cohn, Ferris, Glovsky and Popeo, P.C.

(57) ABSTRACT

Features relating to a laser etching and/or tag writing machine are provided. The machine may include a tray assembly including a tray and a nest. The tray may hold an array of vaporizer cartridges. The tray may allow for a laser-etching operation to be performed by the machine on at least one or two sides of the vaporizer cartridges held by the tray. The tray may allow for the array of vaporizer cartridges to be rotated at the same time between laser etching operations. The tray may additionally and/or alternatively allow for the machine, such as via an antenna, to write data to an NFC tag of a corresponding vaporizer cartridge before, during, and/or after each laser etching operation.

20 Claims, 15 Drawing Sheets

(51) Int. Cl.
  *A24F 40/42*    (2020.01)
  *B23K 26/08*    (2014.01)
  *B23K 26/362*   (2014.01)
  *G06K 7/10*     (2006.01)
  *H04B 5/00*     (2006.01)
(52) U.S. Cl.
  CPC ........ *B23K 26/362* (2013.01); *G06K 7/10297*
         (2013.01); *H04B 5/0056* (2013.01)
(58) Field of Classification Search
  CPC ..... A24F 42/80; B23K 26/083; B23K 26/362;
         G06K 7/10297; G06K 7/10; G06K
         7/10366; G06K 7/10198; G06K 7/0677;
         H04B 5/0056
  See application file for complete search history.

(56)  References Cited

U.S. PATENT DOCUMENTS

| | | | | |
|---|---|---|---|---|
| 6,083,771 | A * | 7/2000 | Ward | H01L 23/544 |
| | | | | 257/E23.179 |
| 6,103,055 | A * | 8/2000 | Maher | H01L 21/67742 |
| | | | | 156/345.32 |
| 6,366,259 | B1 * | 4/2002 | Pruett | H01Q 21/0025 |
| | | | | 343/700 MS |
| 6,413,874 | B1 * | 7/2002 | Sato | H01L 21/30604 |
| | | | | 438/458 |
| 6,476,362 | B1 * | 11/2002 | Deacon | H05B 3/0047 |
| | | | | 118/724 |
| 6,600,659 | B1 * | 7/2003 | Barnett | H05K 9/0024 |
| | | | | 361/761 |
| 6,842,145 | B1 * | 1/2005 | Ryken, Jr. | H01Q 1/38 |
| | | | | 343/846 |
| D532,654 | S * | 11/2006 | Raichlen | D7/409 |
| D609,525 | S * | 2/2010 | Rabanal | D7/409 |
| 9,247,773 | B2 | 2/2016 | Memari et al. | |
| 9,271,525 | B2 | 3/2016 | Liu | |
| 9,439,455 | B2 | 9/2016 | Alarcon et al. | |
| 9,668,522 | B2 | 6/2017 | Memari et al. | |
| 9,802,011 | B2 | 10/2017 | Davidson et al. | |
| 9,907,337 | B2 | 3/2018 | Alarcon et al. | |
| 9,943,107 | B2 | 4/2018 | Weigensberg et al. | |
| 10,314,343 | B2 | 6/2019 | Newcomb et al. | |
| 10,531,766 | B1 * | 1/2020 | Mackey-Ponte | A47J 37/0871 |
| 10,721,969 | B2 | 7/2020 | Capuano et al. | |
| 10,759,554 | B2 | 9/2020 | Sebastian et al. | |
| 11,311,128 | B2 * | 4/2022 | Tanaskoski | A47G 23/0208 |
| 2006/0071414 | A1 * | 4/2006 | Kawatsu | B65H 9/101 |
| | | | | 271/226 |
| 2008/0289511 | A1 * | 11/2008 | Mendez | A47J 36/22 |
| | | | | 99/357 |
| 2008/0299685 | A1 * | 12/2008 | Matsunami | H01L 23/3114 |
| | | | | 29/25.01 |
| 2010/0059748 | A1 * | 3/2010 | Yamazaki | H01L 27/1266 |
| | | | | 257/679 |
| 2010/0164726 | A1 * | 7/2010 | Tada | H01Q 9/26 |
| | | | | 340/572.7 |
| 2011/0011939 | A1 * | 1/2011 | Seah | G06K 19/07752 |
| | | | | 156/64 |
| 2011/0109111 | A1 * | 5/2011 | Petouhoff | D06Q 1/00 |
| | | | | 296/1.08 |
| 2012/0260809 | A1 * | 10/2012 | Esposito | A47J 37/041 |
| | | | | 99/421 H |
| 2014/0338545 | A1 * | 11/2014 | Ramadan | A47J 37/049 |
| | | | | 99/445 |
| 2015/0136158 | A1 | 5/2015 | Stevens et al. | |
| 2015/0245654 | A1 | 9/2015 | Memari et al. | |
| 2015/0245655 | A1 | 9/2015 | Memari et al. | |
| 2015/0245657 | A1 | 9/2015 | Memari et al. | |
| 2015/0245662 | A1 | 9/2015 | Memari et al. | |
| 2015/0245665 | A1 | 9/2015 | Memari et al. | |
| 2015/0245666 | A1 | 9/2015 | Memari et al. | |
| 2015/0245667 | A1 | 9/2015 | Memari et al. | |
| 2015/0245668 | A1 | 9/2015 | Memari et al. | |
| 2015/0327596 | A1 | 11/2015 | Alarcon et al. | |
| 2015/0366268 | A1 | 12/2015 | Shabat | |
| 2016/0005957 | A1 * | 1/2016 | Kodaira | H01L 21/3065 |
| | | | | 438/3 |
| 2016/0150824 | A1 | 6/2016 | Memari et al. | |
| 2016/0166106 | A1 * | 6/2016 | Rubio Garcia | A47J 37/0718 |
| | | | | 99/446 |
| 2016/0253858 | A1 * | 9/2016 | Marquardt | B65H 7/20 |
| | | | | 271/10.02 |
| 2016/0325858 | A1 | 11/2016 | Ampolini et al. | |
| 2016/0364686 | A1 * | 12/2016 | Wolfe | G07F 17/0092 |
| 2017/0136196 | A1 | 5/2017 | Davidson et al. | |
| 2017/0349381 | A1 * | 12/2017 | Beaucage | H01L 21/67333 |
| 2018/0000160 | A1 * | 1/2018 | Taschner | F22B 1/284 |
| 2018/0085551 | A1 | 3/2018 | Krietzman | |
| 2018/0138576 | A1 * | 5/2018 | Cohen | H01Q 1/22 |
| 2018/0271149 | A1 * | 9/2018 | Holtz | A24F 40/60 |
| 2018/0317703 | A1 * | 11/2018 | Khachatrian | A47J 37/049 |
| 2018/0360266 | A1 * | 12/2018 | Lee | A47J 37/049 |
| 2019/0021400 | A1 | 1/2019 | Fornarelli | |
| 2019/0166913 | A1 | 6/2019 | Trzecieski | |
| 2019/0200674 | A1 | 7/2019 | Tucker et al. | |
| 2019/0313848 | A1 * | 10/2019 | Sanchez | A47J 37/0786 |
| 2019/0335948 | A1 * | 11/2019 | Reales Bertomeo | A47J 39/02 |
| 2020/0000143 | A1 | 1/2020 | Anderson et al. | |
| 2020/0000146 | A1 * | 1/2020 | Anderson | A24F 40/40 |
| 2020/0113384 | A1 * | 4/2020 | Loesch | A47J 37/049 |
| 2020/0146361 | A1 * | 5/2020 | Silver | A61M 11/042 |
| 2020/0236988 | A1 * | 7/2020 | Jarrett | A24C 5/44 |
| 2020/0358194 | A1 * | 11/2020 | Reppel | H01Q 21/065 |
| 2021/0056374 | A1 * | 2/2021 | Lotya | G06K 19/07743 |
| 2021/0093808 | A1 * | 4/2021 | Garcia | A61M 15/06 |
| 2021/0145077 | A1 * | 5/2021 | Mah | A24F 40/70 |
| 2021/0219608 | A1 * | 7/2021 | Carlberg | A24F 40/70 |
| 2021/0298520 | A1 * | 9/2021 | West | A47J 37/0786 |
| 2021/0353098 | A1 * | 11/2021 | Huang | A47J 37/0635 |
| 2021/0401061 | A1 * | 12/2021 | Davis | A24F 40/57 |
| 2022/0087459 | A1 * | 3/2022 | Patten | A47G 23/0216 |
| 2022/0151295 | A1 * | 5/2022 | Cornils | A24F 40/44 |

FOREIGN PATENT DOCUMENTS

| | | |
|---|---|---|
| DE | 102017130501 B4 | 7/2021 |
| EP | 3442361 B1 | 5/2020 |
| WO | WO-2010045671 A1 | 4/2010 |
| WO | WO-2011101701 A1 | 8/2011 |
| WO | WO-2011137453 A2 | 11/2011 |
| WO | WO-2016074230 A1 | 5/2016 |
| WO | WO-2016154897 A1 | 10/2016 |
| WO | WO-2016187695 A1 | 12/2016 |
| WO | WO-2016199066 A1 | 12/2016 |
| WO | WO-2020006305 A1 | 1/2020 |
| WO | WO-2020023547 A1 | 1/2020 |
| WO | WO-2020097570 A1 | 5/2020 |

* cited by examiner

200

```
┌─────────────────────────────────────────────────────────┐
│ PERFORMING A FIRST LASER ETCHING OPERATION BY AT LEAST  │
│ LASER ETCHING A FIRST SET OF CARTRIDGE DATA ONTO A FIRST│
│ SIDE OF A VAPORIZER CARTRIDGE OF AN ARRAY OF VAPORIZER  │
│ CARTRIDGES HELD WITHIN A TRAY OF A LASER ETCHING        │
│ AND/OR TAG WRITING MACHINE                              │
│ 202                                                     │
└─────────────────────────────────────────────────────────┘
                              │
┌─────────────────────────────────────────────────────────┐
│ ROTATING THE TRAY 180 DEGREES ABOUT A CENTRAL           │
│ LONGITUDINAL AXIS THAT EXTENDS BETWEEN A PROXIMAL       │
│ END OF THE TRAY AND A DISTAL END OF THE TRAY            │
│ 204                                                     │
└─────────────────────────────────────────────────────────┘
                              │
┌─────────────────────────────────────────────────────────┐
│ PERFORMING A SECOND LASER ETCHING OPERATION BY AT       │
│ LEAST LASER ETCHING A SECOND SET OF CARTRIDGE DATA      │
│ ONTO A SECOND SIDE OF THE VAPORIZER CARTRIDGE           │
│ 206                                                     │
└─────────────────────────────────────────────────────────┘
                              │
┌─────────────────────────────────────────────────────────┐
│ WRITING CARTRIDGE DATA TO AN NFC TAG OF THE VAPORIZER   │
│ CARTRIDGE                                               │
│ 208                                                     │
└─────────────────────────────────────────────────────────┘
```

FIG. 20

MACHINE FOR LASER ETCHING AND TAG WRITING A VAPORIZER CARTRIDGE

CROSS-REFERENCE TO RELATED APPLICATIONS

The present application claims priority to U.S. Provisional Application No. 62/936,362, filed Nov. 15, 2019, and entitled, "MACHINE FOR LASER ETCHING AND TAG WRITING A VAPORIZER CARTRIDGE," the entirety of which is incorporated by reference herein.

TECHNICAL FIELD

The current subject matter described herein relates to laser etching and writing data to a vaporizer cartridge, intended for use with a vaporizer device, and more particularly to a tray assembly for a laser etching and/or tag writing machine.

BACKGROUND

Vaporizing devices, including electronic vaporizers or e-vaporizer devices, allow the delivery of vapor and aerosol containing one or more active ingredients by inhalation of the vapor and aerosol. Electronic vaporizer devices are gaining increasing popularity both for prescriptive medical use, in delivering medicaments, and for consumption of nicotine, tobacco, other liquid-based substances, and other plant-based smokeable materials, such as *cannabis*, including solid (e.g., loose-leaf or flower) materials, solid/liquid (e.g., suspensions, liquid-coated) materials, wax extracts, and prefilled pods (cartridges, wrapped containers, etc.) of such materials. Electronic vaporizer devices in particular may be portable, self-contained, and convenient for use.

SUMMARY

Aspects of the current disclosure relate to laser etching and/or writing data to one or more vaporizer cartridges, intended for use with a vaporizer device. Aspects of the current disclosure also relate to a tray assembly of a laser etching and/or tag writing machine that allows for the one or more vaporizer cartridges to be laser etched on one or two sides, and/or for data to be written to the one or more vaporizer cartridges.

According to some aspects, a tray assembly for a machine may be configured for one or more of a laser etching operation and a tag writing operation. The tray assembly may include a tray. The tray may hold an array of vaporizer cartridges during one or more of the laser etching operation and the tag writing operation. The tray may include a first cartridge positioner, a second cartridge positioner, and an array of cartridge retainers defined by the first cartridge positioner and the second cartridge positioner. The second cartridge positioner may be rotatably coupled with the first cartridge positioner. The array of cartridge retainers may be defined by the first cartridge positioner and the second cartridge positioner such that each cartridge retainer of the array of cartridge retainers includes a first opening formed through the first cartridge positioner, and a second opening formed through the second cartridge positioner. The first opening may be configured to provide access to a first portion of a first side of a vaporizer cartridge of the array of vaporizer cartridges held within the tray. The second opening may be positioned opposite the first opening. The second opening may be configured to provide access to a second portion of a second side of the vaporizer cartridge. The tray may be rotated 180 degrees about a central longitudinal axis of the tray that extends between a proximal end of the tray and a distal end of the tray. The rotation of the tray may cause each vaporizer cartridge of the array of vaporizer cartridges to rotate 180 degrees about the central longitudinal axis. The rotation of the tray may allow for the first portion and the second portion of the vaporizer cartridge to be laser etched with cartridge data.

In some aspects, the tray assembly includes a nest configured to be coupled to and hold the tray assembly during one or more of the laser etching operation and the tag writing operation. The nest may include a frame and an array of antennas. The frame may support the tray and include at least two side walls to position the tray within the nest. Each antenna of the array of antennas may align with each cartridge retainer of the array of cartridge retainers. Each antenna may write the cartridge data to an NFC tag of each vaporizer cartridge of the array of vaporizer cartridges.

In some aspects, the nest includes a circuit board and a mezzanine board coupled to the circuit board. The array of antennas may be etched into the mezzanine board. The array of antennas may be positioned beneath the tray. The frame may include a cover, which is positioned over the array of antennas. The nest may include at least one magnet to magnetically secure the tray to the nest.

In some aspects, the array of vaporizer cartridges includes at least five rows of vaporizer cartridges and at least five columns of vaporizer cartridges.

In some aspects, the first opening and the second opening each form a boundary around the first portion and the second portion to be laser etched with the cartridge data.

In some aspects, the cartridge data includes vaporizable material information relating to a vaporizable material stored within each vaporizer cartridge of the array of vaporizer cartridges.

According to some aspects, a machine includes the tray assembly and a laser. The laser may laser etch one or more of the first portion of each vaporizer cartridge of the array of vaporizer cartridges and the second portion of each vaporizer cartridge of the array of vaporizer cartridges. The machine may include an array of antennas, which write the cartridge data to an NFC tag of each vaporizer cartridge of the array of vaporizer cartridges. The machine may include a controller having at least one data processor and at least one memory storing instructions, which when executed by the at least one data processor, result in operations that include performing a first laser etching operation. The first laser etching operation includes laser etching a first set of cartridge data onto the first portion of each vaporizer cartridge of the array of vaporizer cartridges. The operations may also include rotating the tray 180 degrees about the central longitudinal axis of the tray to provide access to the second portion of the vaporizer cartridge. The rotation of the tray may cause each vaporizer cartridge of the array of vaporizer cartridges to rotate 180 degrees about the central longitudinal axis of the tray. The operations may also include performing a second laser etching operation that includes laser etching a second set of cartridge data onto the second portion of each vaporizer cartridge of the array of vaporizer cartridges. The operations may also include writing a third set of cartridge data to the NFC tag of each vaporizer cartridge of the array of vaporizer cartridges.

In some aspects, the writing the third set of cartridge data is performed during one or more of the first laser etching operation and the second laser etching operation. In some aspects, the writing the third set of cartridge data is performed before rotation of the tray. In some aspects, the writing the third set of cartridge data is performed after rotation of the tray. In some aspects, the first set of cartridge data and the second set of cartridge data include vaporizable material information relating to a vaporizable material stored within each vaporizer cartridge of the array of vaporizer cartridges.

In some aspects, the third set of cartridge data includes one or more of manufacturing data, manufacturing test data, manufacturing test parameters, material logging, filler data, vaporizable material data, and usage data.

In some aspects, the first set of cartridge data is laser etched onto the first portion of each vaporizer cartridge of the array of vaporizer cartridges in a sequence. The sequence may include sequentially laser etching each of the vaporizer cartridges held in the tray in an order indicated by a positional indicator on the tray.

In some aspects, the second set of cartridge data is laser etched onto the second portion of each vaporizer cartridge of the array of vaporizer cartridges in a sequence. The sequence may include sequentially laser etching each of the vaporizer cartridges held in the tray in an order indicated by a positional indicator on the tray.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings:

FIG. 20 is an example method of laser etching and/or tag writing a vaporizer cartridge consistent with implementations of the current subject matter.

When practical, similar reference numbers denote similar structures, features, or elements.

DETAILED DESCRIPTION

Figure 1A:
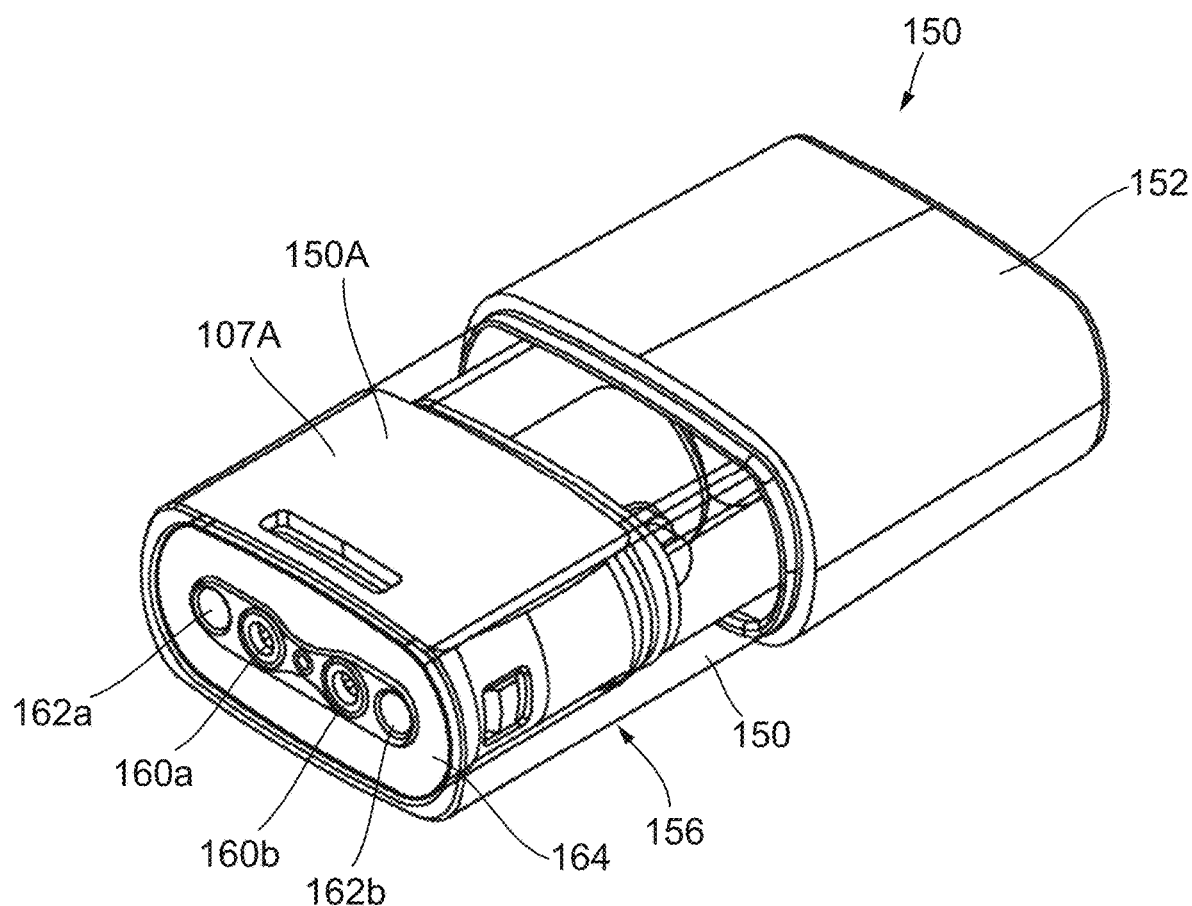
FIGS. 1A and 1B illustrate an example vaporizer cartridge that may be used with a laser etching and/or tag writing machine consistent with implementations of the current subject matter.

Implementations of the current subject matter include devices relating to vaporizing of one or more materials for inhalation by a user. The term "vaporizer" may be used generically in the following description and may refer to a vaporizer device, such as an electronic vaporizer. Vaporizers consistent with the current subject matter may be referred to by various terms such as inhalable aerosol devices, aerosolizers, vaporization devices, electronic vaping devices, electronic vaporizers, vape pens, etc. Examples of vaporizers consistent with implementations of the current subject matter include electronic vaporizers, electronic cigarettes, e-cigarettes, or the like. In general, such vaporizers are often portable, hand-held devices that heat a vaporizable material to provide an inhalable dose of the material. The vaporizer may include a heater configured to heat a vaporizable material which results in the production of one or more gas-phase components of the vaporizable material. A vaporizable material may include liquid and/or oil-type plant materials, or a semi-solid like a wax, or plant material such as leaves or flowers, either raw or processed. The gas-phase components of the vaporizable material may condense after being vaporized such that an aerosol is formed in a flowing air stream that is deliverable for inhalation by a user.

One or more features of the current subject matter, including one or more of a cartridge (also referred to as a vaporizer cartridge or pod) and a reusable vaporizer device body (also referred to as a vaporizer device base, a body, a vaporizer body, or a base), may be employed with a suitable vaporizable material (where suitable refers in this context to being usable with a device whose properties, settings, etc. are configured or configurable to be compatible for use with the vaporizable material). The vaporizable material may include one or more liquids, such as oils, extracts, aqueous or other solutions, etc., of one or more substances that may be desirably provided in the form of an inhalable aerosol. The cartridge may be inserted into the vaporizer body, and then the vaporizable material heated which results in the inhalable aerosol.

The cartridge may be used to provide information to the user of the cartridge. In some implementations, one or both sides of the cartridge may be used to provide information (e.g., cartridge data) to the user about the cartridge and/or the vaporizable material stored within the cartridge. For example, a brand logo or other brand information relating to the manufacturer of the vaporizable material may be displayed on one or more sides of the cartridge. Additionally and/or alternatively, information relating to the vaporizable material, such as vaporizable material name, type, strength, composition, and/or the like may be displayed on one or more sides of the cartridge. This information may be useful to the user, to better inform the user, provide useful details about the particular cartridge, and to make the user aware of the contents of the cartridge. Such information may be useful when the user is purchasing a cartridge. Such information may also be useful when various settings of the vaporizer device are modified, such as when the user uses the vaporizer device. For example, a temperature setting of the vaporizer device may depend on various properties of the specific vaporizable material stored within each cartridge.

The cartridge data may be presented on the cartridge on one or more sides. This allows for a greater amount of information to be displayed on the exterior of the cartridge. Presenting the information on one or more sides of the cartridge may also be desirable because the cartridge is usable in multiple orientations (e.g., the cartridge may be used in a first orientation as well as a second orientation, in which the cartridge is rotated, from the first orientation, 180 degrees about a central axis).

Since the cartridge may be made of certain materials, such as plastic, glass, and/or the like, it may be difficult to display the cartridge data on the exterior of the cartridge, without requiring an additional component, such as a label to be applied to an external surface of the cartridge. Thus, consistent with implementations of the current subject matter, the cartridge data may be laser etched onto one or more sides of the cartridge. Generally, however, laser etching one side of a single cartridge, rotating the cartridge, and laser etching another side of the cartridge may require a significant amount of time and resources. The amount of time and resources required to laser etch at least two sides of the cartridge, for example, may significantly increase when laser etching more than one cartridge, especially in some circumstances in which hundreds, thousands, or more cartridges are being laser etched on multiple sides.

A tray assembly described herein is capable of holding an array (e.g., rows and/or columns of at least one, two, three, four, five or more) of cartridges such that all of the cartridges held by the tray may be rotated at the same time during a laser etching operation and be more easily laser etched on at least two sides of the cartridge. Thus, aspects of the current subject matter provide for improved laser etching of cartridges by addressing the described limiting factors. For example, aspects of the current subject matter include reducing the amount of time to laser etch each cartridge, reducing the amount of time to laser etch a batch of cartridges, allowing for multiple cartridges to be laser etched at the same time, and simplifying the process for laser etching both sides of the cartridge.

In some implementations, the cartridge may additionally and/or alternatively provide information or other data to the user via a tag, such as a data tag, a near-field communication (NFC) tag, or other type of wireless transceiver or communication tag. The tag may store pertinent data relating to the cartridge, which, as described in more detail herein, may be transferred to one or more of the remote processors, such as a user device or other remote server. Writing the data to the tag of each cartridge may be difficult and require a large amount of time. For example, writing data to a large number of cartridges may consume a large amount of time and/or processing power, as each cartridge may need to be replaced after data is written to the tag of the cartridge, so that data may be written to the tag of the next cartridge, and so on. The tray assembly described herein may facilitate improved and more efficient tag writing capabilities. For example, the tray assembly described herein may allow for data to be written to multiple cartridges at the same time.

Writing data to tags of multiple cartridges at the same time may be difficult in some situations. For example, when writing data to tags of multiple cartridges at the same time, it may be difficult to ensure that the data is being written to the correct cartridge. Writing incorrect data or information about the cartridge to the incorrect cartridge may be harmful to the user, as the user would be unaware of the type of vaporizable material from which an aerosol is generated and which the user inhales. This may result in an undesirable user experience to the user, as the user experience may be different from what the user expected, and/or depending on the type of vaporizable material, may result in harm to the user. The tray assembly described herein desirably helps to reduce the likelihood or otherwise prevent incorrect data from being written to the incorrect tag. For example, the tray assembly may include an array of antennas, which write the data to the tags of the cartridges. The array of antennas may help to ensure a 1:1 match between antennas and tags of the cartridges. Such configurations help to improve the accuracy of writing data to the tags of cartridges, and may help to ensure that the correct data is written to the correct cartridge. This helps ensure to ensure that the tag of the cartridge provides accurate information to the user about, for example, the vaporizable material stored within the cartridge, and/or the like. Such configuration may result in an improved user experience.

In some instances, a machine, which has a sole function of writing data to tags of cartridges or printing data to an external surface of the cartridge may be also implemented. Such machines, however, may result in a fragmented approach to preparing a cartridge, thereby reducing efficiency and increasing the amount of time required to prepare the cartridge. For example, a first machine may write data to the tags of the cartridges and a second separate machine may apply data to the external surface of the cartridge, such as via a label, laser etching, and/or the like. The tray assembly of the laser etching and/or tag writing machine described herein may more efficiently prepare cartridges. For example, the tray assembly described herein may be used to facilitate applying data, such as via laser etching, to a portion of the cartridges and/or writing data to the cartridges by the same machine.

Before providing additional details regarding aspects of a laser etching and/or tag writing machine, the following provides a description of some examples of vaporizer cartridges. The following descriptions are meant to be exemplary, and cartridges consistent with the current subject matter are not limited to the example cartridges or vaporizer devices described herein.

Figure 1B:
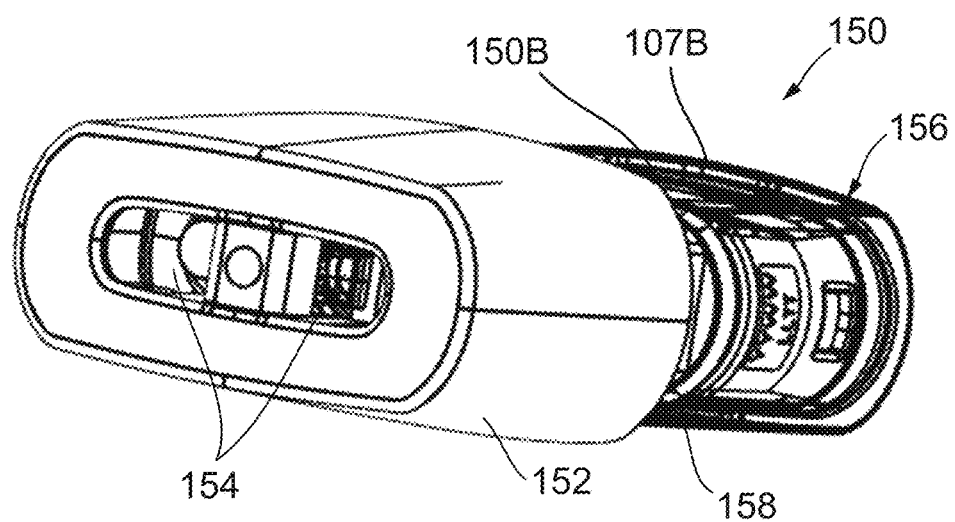

As shown in FIGS. 1A and 1B, the cartridge 150 includes, at the proximal end, a mouthpiece 152 that is attached over a cartridge body 156 that forms a reservoir or tank 158 that holds a vaporizable material. The cartridge body 156 may be transparent, translucent, opaque, or a combination thereof. The mouthpiece 152 may include one or more openings 154 at the proximal end out of which vapor may be inhaled, by drawing breath through a vaporizer device connected with the cartridge 150. The distal end of the cartridge body 156 may couple to and be secured to a vaporizer body of the vaporizer device, within a cartridge receptacle of the vaporizer body. Power pin receptacles 160a,b of the cartridge 150 mate with respective power pins or contacts of the vaporizer body that extend into the cartridge receptacle. According to implementations of the current subject matter, a variety of electrical connectors other than a pogo-pin and complementary pin receptacle configuration may be used to electrically connect the vaporizer body and the cartridge 150, such as for example, a plug and socket connector. The cartridge 150 also includes air flow inlets 162a,b on the distal end of the cartridge body 156.

The cartridge 150 may fit within the cartridge receptacle of the vaporizer body of the vaporizer device by a friction fit, snap fit, and/or other types of secure connection. The cartridge 150 may have a rim, ridge, protrusion, and/or the like for engaging a complimentary portion of the vaporizer body. While fitted within the cartridge receptacle of the vaporizer body, the cartridge 150 may be held securely within but still allow for being easily withdrawn to remove the cartridge 150.

The vaporizer cartridge 150 may also include a tag 164. The tag 164, such as a data tag, a near-field communication (NFC) tag, or other type of wireless transceiver or communication tag, may be positioned on at least a portion of the distal end of the cartridge body 156. As shown in FIG. 1A, the tag 164 may substantially surround the power pin receptacles 160a,b and the air flow inlets 162a,b, although other configurations of the tag 164 may be implemented as well. For example, the tag 164 may be positioned between the power pin receptacle 160a and the power pin receptacle 160b, or the tag 164 may be shaped as a circle, partial circle, oval, partial oval, or any polygonal shape encircling or partially encircling the power pin receptacles 160a,b and the air flow inlets 162a,b or a portion thereof.

The tag 164 may be a type of wireless transceiver and may include a microcontroller unit (MCU), a memory, and an antenna (e.g., an NFC antenna) to perform various functionalities. The tag 164 may be, for example, a 1 Kbit or a 2 Kbit tag that is of type ISO/IEC 15693. NFC tags with other specifications may also be used. The tag 164 may be implemented as active NFC, enabling reading and/or writing information via NFC with other NFC compatible devices including a remote processor, another vaporizer device, and/or wireless communication circuitry of a vaporizer device or other device. Alternatively, the tag 164 may be implemented using passive NFC technology, in which case other NFC compatible devices (e.g., a remote processor, another vaporizer device, and/or wireless communication circuitry) may only be able to read information from the tag 164. Alternatively or additionally, the tag 164 may also be used to detect when the cartridge 150 is connected to the vaporizer body 110. Alternatively or additionally, the tag 164 may be used to detect the position of a vaporizer cartridge 150 with a tray (which is described in more detail below).

Figure 2:
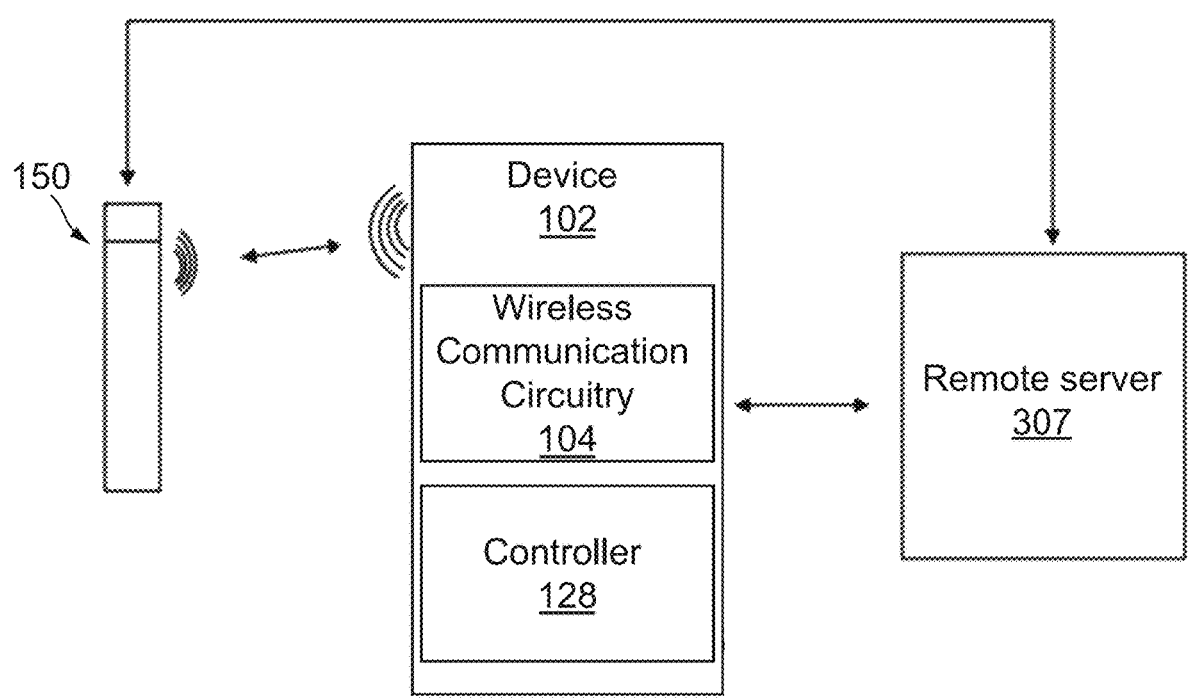
FIG. 2 illustrates communication between a vaporizer cartridge, a device, and a server consistent with implementations of the current subject matter.

FIG. 2 illustrates communication between a vaporizer device 100 (including for example, the cartridge 150), a device 102 (e.g., a laser etching and/or tag writing machine, a smartphone, a tablet, a laptop, and/or the like), and a remote server 307 (e.g., a server coupled to a network, a cloud server, and/or the like) consistent with implementations of the current subject matter. The device 102 wirelessly communicates with the vaporizer device (e.g., the cartridge 150). A remote server 307 may communicate directly with the vaporizer device and/or cartridge 150 or through the device 102. In some implementations, the cartridge 150 may establish communication with the device 102 and/or the remote server 307 through the tag 164.

An application software ("app") running on at least one of the remote processors (the device 102 and/or the remote server 307) may be configured to control operational aspects of the vaporizer device and/or the cartridge 150 and receive information relating to operation of the vaporizer device and/or cartridge 150. For example, the app may provide a user with capabilities to input or set desired properties or effects, such as, for example, a particular temperature or desired dose, which is then communicated to the vaporizer device through the wireless communication circuitry. The app may also provide a user with functionality to select one or more sets of suggested properties or effects that may be based on the particular type of vaporizable material in the cartridge 150. For example, the app may allow adjusting heating based on the type of vaporizable material, the user's (of the vaporizer device and/or cartridge 150) preferences or desired experience, and/or the like.

Data stored on the tag 164 may be transferred to and/or from one or more of the remote processors (e.g., the device 102 and/or the remote server 307) to which it is connected, which allows for the app running on the one or more processors to access and utilize the read data for a variety of purposes. For example, the read data relating to the cartridge 150 may be used for providing recommended temperatures, dose control, usage tracking, and/or assembly information.

Additionally, the cartridge 150 may communicate directly, through the tag 164, with one or more remote processors (e.g., the device 102), such as, for example, a laser etching and/or tag writing equipment, a smartphone, tablet, assembly equipment, and/or filling equipment. This enables data relating to the cartridge to be written to/read from the tag 164, without interfacing with the vaporizer body of the vaporizer device. The tag 164 thus allows for identifying information related to the cartridge 150 (e.g., the cartridge data) to be associated with the cartridge 150 by one or more remote processors. For example, when the cartridge 150 is filled with a certain type of vaporizable material, this information may be transmitted to the tag 164 by filling equipment and/or laser etching and/or tag writing equipment. Then, the vaporizer body of the vaporizer device is able to obtain this information from the tag 164 to identify the vaporizable material currently being used and accordingly adjust the controller of the vaporizer body based on, for example, user-defined criteria or pre-set configuration parameters associated with the particular type of vaporizable material (set by a manufacturer or as determined based upon user experiences/feedback aggregated from other users). For example, a user may establish (via the app) a set of criteria relating to desired effects for or usage of one or more types of vaporizable materials. When a certain vaporizable material is identified, based on communication via the tag 164, the controller of the vaporizer body of the vaporizer device accordingly adopts the established set of criteria, which may include, for example, temperature and dose, for that particular vaporizable material.

Other information related to the cartridge 150 may be transmitted to and stored on the tag 164 (e.g., by the laser etching and/or tag writing equipment), such as information relating to components of the cartridge 150, for example heating components. The vaporizer body (e.g., the controller of the vaporizer body) may use this information to control a usage session for a user. A manufacturer may thus transmit manufacturing information to the tag 164 for storage for subsequent use by the controller or other remote processors (e.g., the device 102 and/or the remote server 307).

Types of data that may be stored on the tag 164 include manufacturing data (e.g., tag serial number, tag manufacturer identifier, tag IC product code, cartridge serial number, cartridge hardware revision code, date of assembly, manufacture (MFG) lot code, MFG test equipment serial number (S/N), MFG test data (e.g., coil resistance, leak/flow rate test, cosmetic check, etc.), MFG test parameters, material logging (e.g., coil type, wick type, etc.), and/or mass of empty cartridge); filler data (which may be added after the cartridge is filled with a vaporizable material, for example, batch identifier (ID), vendor ID, product ID, strain code, mass of filled cartridge, viscosity, default/min/max temperature setting, tetrahydrocannabinol (THC) content percentage (%), cannabidiol (CBD) %, terpene %, extraction method, and/or fill date); data from a certificate of analysis; and/or usage data (e.g., total puffs taken, total puff time, drop count, total energy delivered to cartridge (joules), date of first/most recent puff, cartridge lock (for locking cartridge to specific device/child lock), cartridge kill (initiating lock out of cartridge), min/max temperature set by user/device, min/max "baseline" resistance measured, count of bad connections (where cartridge did not properly dock and measure baseline resistance), and/or various device error codes). As previously described, the data stored on the tag 164 may also include pre-set or user-established configuration parameters relating to operation of the vaporizer body of the vaporizer device with respect to the particular cartridge 150 and/or the particular type of vaporizable material (e.g., a predetermined temperature and/or parameters associated with a dose) stored within the cartridge 150. The tag data may be encrypted and/or hashed, and the tag 164 may be password protected.

The device 102 may include wireless communication circuitry 104, which may include at least one near-field communication (NFC) antenna that is configured to read from and/or write to the tag 164 of the cartridge 150.

The wireless communication circuitry may include additional components including circuitry for other communication technology modes, such as Bluetooth circuitry, Bluetooth Low Energy circuitry, Wi-Fi circuitry, cellular (e.g., LTE, 4G, and/or 5G) circuitry, and associated circuitry (e.g., control circuitry), for communication with other devices. For example, the vaporizer body and/or the vaporizer cartridge 150 may be configured to wirelessly communicate with a remote processor (e.g., a smartphone, a tablet, a computer, wearable electronics, a cloud server, filling equipment, laser etching and/or tag writing equipment and/or processor based devices) having the wireless communication circuitry 104, and the vaporizer cartridge 150 may through this communication receive information including control information (e.g., for setting temperature, resetting a dose counter, etc.) from and/or transmit output information (e.g., dose information, operational information, error information, temperature setting information, charge/battery information, etc.) to one or more of the remote processors.

The device 102 may include a controller 128 that includes at least one processor and/or at least one memory configured to control and manage various operations of the device 102, such as a laser etching and/or tag writing machine (e.g., machine 110 described below) described herein. For example, the controller 128 and/or the tag 164 may passively and/or actively control one or more of the laser etching operations described herein. In some implementations, the controller 128 controls an order, sequence, and/or pattern of each of the laser etching operations described herein. In some implementations, the controller 128 receives an input, such as via the display 112 and adjusts one or more of the operations described herein. In some implementations, the controller 128 may initialize and/or end one or more of the operations described herein. In some implementations, the controller 128 may control one or more of the tag writing operations described herein. For example, the controller 128 may determine which data should be written to the NFC tag of each vaporizer cartridge.

Figure 3A:
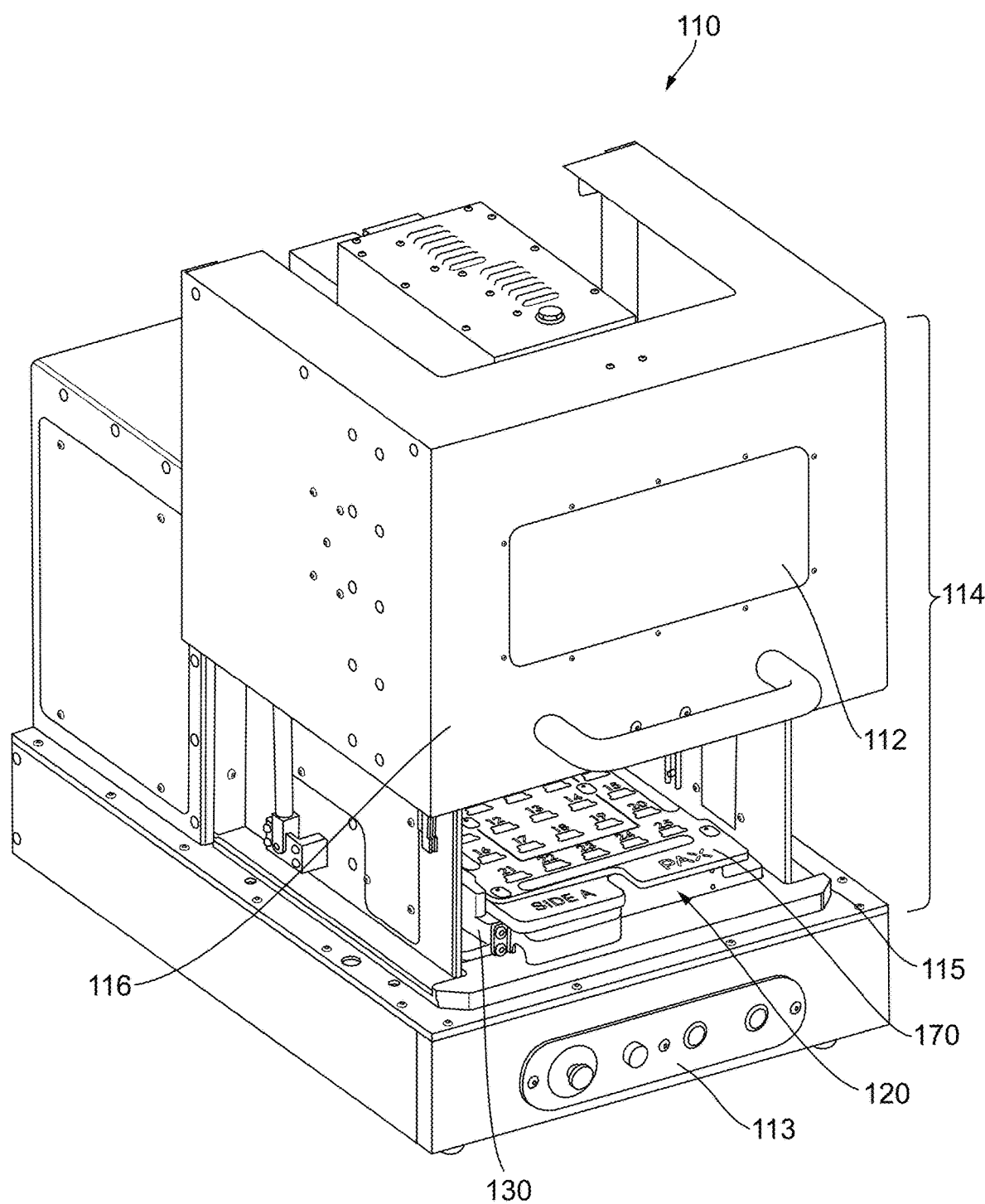
FIGS. 3A and 3B illustrate an example laser etching and/or tag writing machine consistent with implementations of the current subject matter.
Figure 3B:
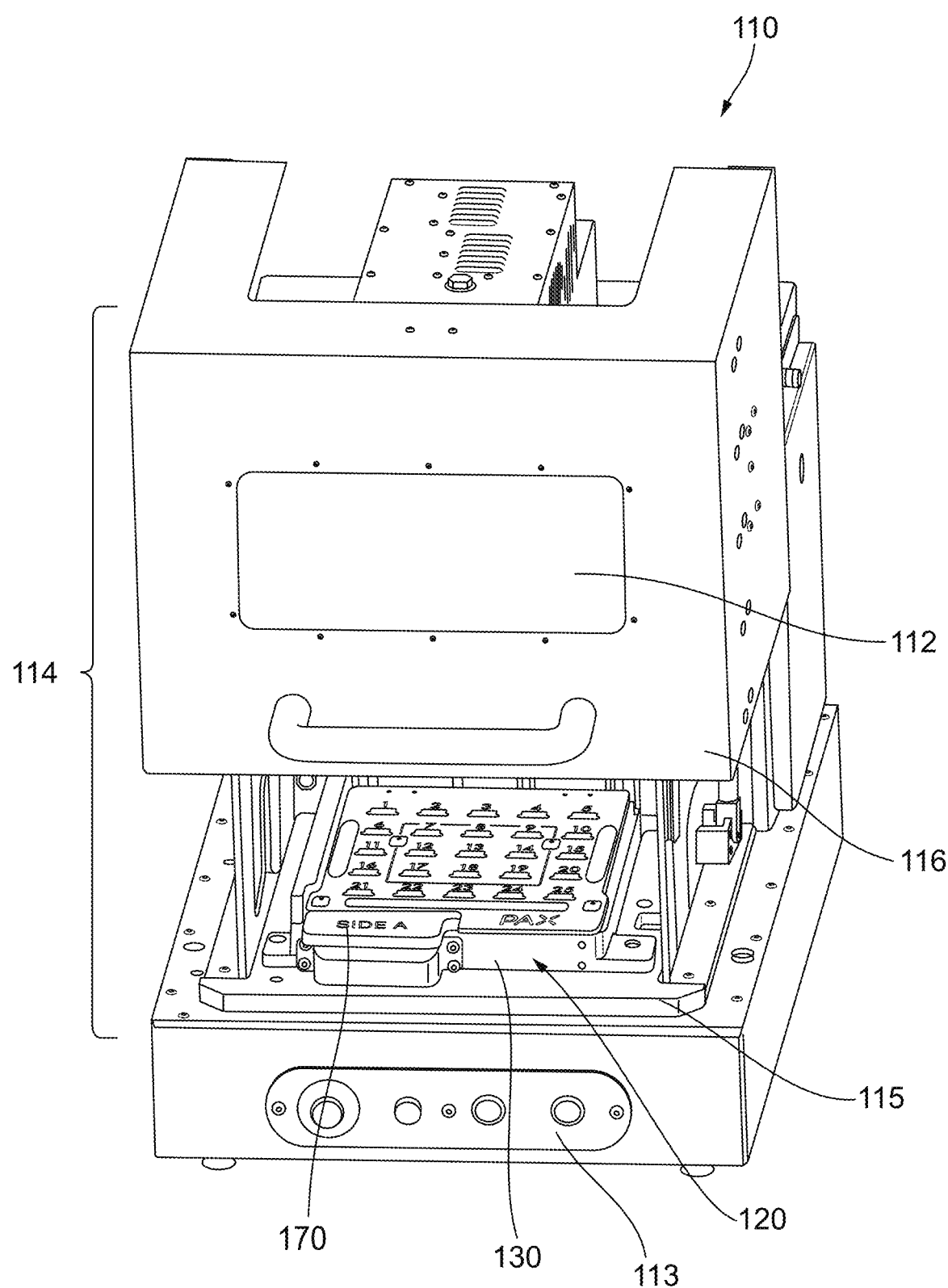

FIGS. 3A and 3B illustrate an example laser etching and/or tag writing machine 110 (also referred to herein as the "machine 110"). The machine 110 may form or otherwise include the device 102. The machine 110 may perform one or more operations on the cartridge 150, such as laser etching cartridge data onto a portion of the cartridge 150 (such as an external surface of the cartridge, a label on or in the cartridge, or another portion of the cartridge), writing data to the tag 164 of the cartridge 150, and/or the like. The machine 110 may perform one or more of these operations on the cartridge 150 in a sequence or pattern, at the same time, and/or at different times. Likewise, the machine 110 may perform one or more of these operations to one or more cartridges 150 (e.g., one, two, three, four, five, ten, fifteen, twenty, twenty five, or more) in a sequence or pattern, at the same time, and/or at different times.

The machine 110 includes a display 112, an enclosure 114, a laser 155, and a tray assembly 120 positioned within the enclosure 114.

The laser 155 may be used to laser etch, engrave, and/or otherwise mark cartridge data, such as the cartridge data described herein, on one or more cartridges 150. The laser 155 may include one or more, such as two, three, four, five, or more lasers. The laser 155 may include a solid-state laser such as Nd:YAG laser, a fiber laser, and/or a CO2 laser, among other types of lasers.

The display 112 may form a part of the machine 110 or may be separately coupled as part of a client device. The display 112 may also include a user interface. The user interface may form a part of a display screen of the display 112 that presents information to the user and/or the user interface may be separate from the display screen. For example, the user interface may be one or more buttons 113, or portions of the display screen that is configured to receive an entry from the user. The client device may be a mobile device such as, for example, a smartphone, a tablet computer, a wearable apparatus, and/or the like, or a separate computing device. However, it should be appreciated that the client device may be any processor-based device including, for example, a desktop computer, a laptop computer, a workstation, and/or the like.

Via the display 112, the user may be able to configure certain parameters of the machine 110 and/or may interact with the machine 110 to cause the machine 110 to perform one or more operations, such as laser etch cartridge data to the cartridge 150 and/or write data to the tag 164 of the cartridge 150. Additionally, in some examples, via the display 112, the user may configure the various operations performed by the machine 110. For example, the display 112 may receive one or more user inputs relating to a number of cartridges positioned within the tray 170, the type of data to be laser etched onto the cartridge 150, the type of data to be written to the tag 164 of the cartridge 150, the sequence of performing one or more of the operations, a start time for performing one or more of the operations, and/or the like.

In some examples, the display 112 (and/or the client device) and the machine 110 may be communicatively coupled via a network. The network may be any wired and/or wireless network including, for example, a public land mobile network (PLMN), a local area network (LAN), a virtual local area network (VLAN), a wide area network (WAN), the Internet, and/or the like.

The enclosure 114 may enclose the tray assembly 120 such that the tray assembly 120 is positioned within the enclosure 114. The tray assembly 120 may be removably secured to at least a portion of the enclosure 114, such as a base 115 of the enclosure 114. For example, in some implementations, the tray assembly 120 is secured to the base 115 via one or more fasteners (e.g., mechanical fasteners), adhesives, and/or the like. At least a portion of the tray assembly 120 may be removed from the machine 110 when cartridges are placed within the tray assembly 120 and may be secured to the machine 110 during and/or before one or more operations are performed. Such configurations provide additional space to open and close the tray assembly when cartridges 150 are loaded onto the tray assembly 120. In other implementations, the cartridges 150 are placed within the tray assembly 120 when the tray assembly 120 is secured to the base 115. In yet other implementations, all or a portion of the tray assembly 120 is permanently attached to the base 115.

The enclosure 114 may include a door 116. The door 116 may movably (e.g., slidably) enclose the tray assembly 120 within the enclosure 114. For example, the door 116 may slide or otherwise move to an opened position (see FIG. 3A and FIG. 3B) to provide access to the tray assembly 120 or interior volume of the enclosure 114. The door 116 may slide or otherwise move to a closed positon (not shown) to enclose the tray assembly 120 during one or more operations, such as a tag writing and/or a laser etching operation.

In some implementations, the display 112 is positioned on a portion of the door 116. Such configuration may make the display 112 more easily accessible to the user.

Figure 19A:
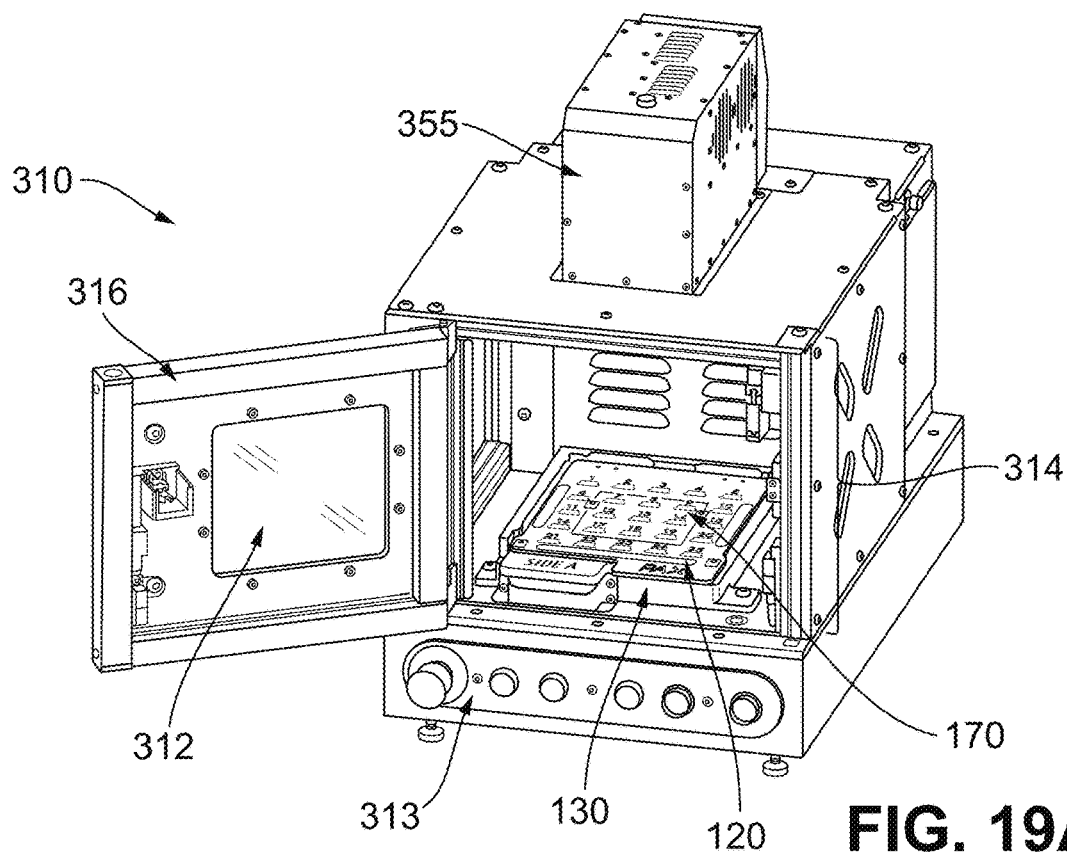
FIGS. 19A and 19B illustrate an example laser etching and/or tag writing machine consistent with implementations of the current subject matter.
Figure 19B:
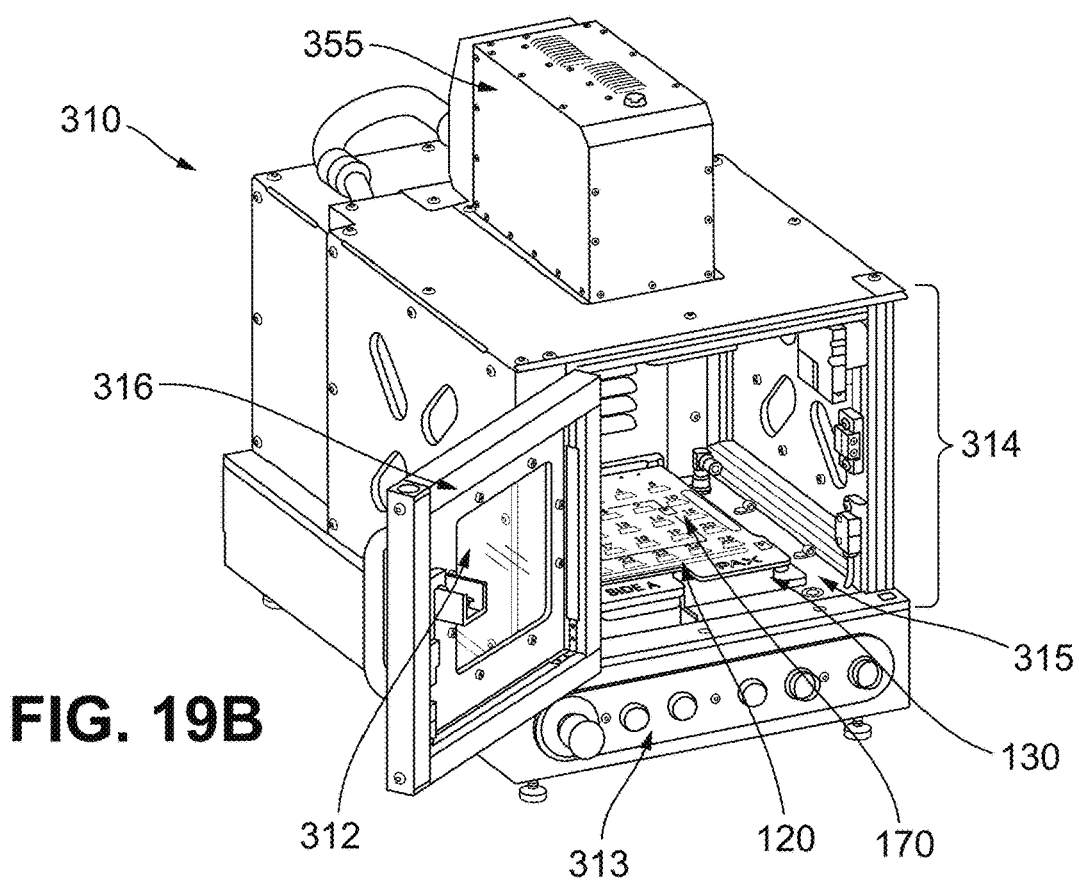

FIGS. 19A and 19B illustrate another example of a laser etching and/or tag writing machine 310 (also referred to herein as the "machine 310") consistent with implementations of the current subject matter. The machine 310 may be the same as or similar to the machine 110. For example, the machine 310 may include one or more of the same or similar components, features, and/or properties as the machine 110. One or more components of the machine 310 may be interchangeable and/or used with one or more components of the machine 110. Similarly, one or more components of the machine 110 may be interchangeable and/or used with one or more components of the machine 310.

The machine 310 may form or otherwise include the device 102. The machine 310 may perform one or more operations on the cartridge 150, such as laser etching cartridge data onto a portion of the cartridge 150 (such as an external surface of the cartridge, a label on or in the cartridge, or another portion of the cartridge), writing data to the tag 164 of the cartridge 150, and/or the like. The machine 310 may perform one or more of these operations on the cartridge 150 in a sequence or pattern, at the same time, and/or at different times. Likewise, the machine 310 may perform one or more of these operations to one or more cartridges 150 (e.g., one, two, three, four, five, ten, fifteen, twenty, twenty five, or more) in a sequence or pattern, at the same time, and/or at different times.

The machine 310 includes a display 312, an enclosure 314, and a laser 355, which may be the same or similar to the display 112, the enclosure 114, and the laser 155, as described herein. The tray assembly 120, as generally described herein with respect to the machine 110 may be positioned within the enclosure 314.

The laser 355 may be used to laser etch, engrave, and/or otherwise mark cartridge data, such as the cartridge data described herein, on one or more cartridges 150. The laser 355 may include one or more, such as two, three, four, five, or more lasers. The laser 355 may include a solid-state laser such as Nd:YAG laser, a fiber laser, and/or a CO2 laser, among other types of lasers.

The display 312 may form a part of the machine 310 or may be separately coupled as part of a client device. The display 312 may also include a user interface. The user interface may form a part of a display screen of the display 312 that presents information to the user and/or the user interface may be separate from the display screen. For example, the user interface may be one or more buttons 313, or portions of the display screen that is configured to receive an entry from the user. The client device may be a mobile device such as, for example, a smartphone, a tablet computer, a wearable apparatus, and/or the like, or a separate computing device. However, it should be appreciated that the client device may be any processor-based device including, for example, a desktop computer, a laptop computer, a workstation, and/or the like.

Via the display 312, the user may be able to configure certain parameters of the machine 310 and/or may interact with the machine 310 to cause the machine 310 to perform one or more operations, such as laser etch cartridge data to the cartridge 150 and/or write data to the tag 164 of the cartridge 150. Additionally, in some examples, via the display 312, the user may configure the various operations performed by the machine 310. For example, the display 312 may receive one or more user inputs relating to a number of cartridges positioned within the tray 170, the type of data to be laser etched onto the cartridge 150, the type of data to be written to the tag 164 of the cartridge 150, the sequence of performing one or more of the operations, a start time for performing one or more of the operations, and/or the like.

In some examples, the display 312 (and/or the client device) and the machine 310 may be communicatively coupled via a network. The network may be any wired and/or wireless network including, for example, a public land mobile network (PLMN), a local area network (LAN), a virtual local area network (VLAN), a wide area network (WAN), the Internet, and/or the like.

The enclosure 314 may enclose the tray assembly 120 such that the tray assembly 120 is positioned within the enclosure 314. The tray assembly 120 may be removably secured to at least a portion of the enclosure 314, such as a base 315 of the enclosure 314. For example, in some implementations, the tray assembly 120 is secured to the base 315 via one or more fasteners (e.g., mechanical fasteners), adhesives, and/or the like. At least a portion of the tray assembly 120 may be removed from the machine 310 when cartridges are placed within the tray assembly 120 and may be secured to the machine 310 during and/or before one or more operations are performed. Such configurations provide additional space to open and close the tray assembly when cartridges 150 are loaded onto the tray assembly 120. In other implementations, the cartridges 150 are placed within the tray assembly 120 when the tray assembly 120 is secured to the base 315. In yet other implementations, all or a portion of the tray assembly 120 is permanently attached to the base 315.

The enclosure 314 may include a door 316. The door 116 may movably (e.g., slidably and/or rotatably) enclose the tray assembly 120 within the enclosure 314. For example, the door 316 may rotate about a hinge or otherwise move to an opened position (see FIGS. 19A and 19B) to provide access to the tray assembly 120 or interior volume of the enclosure 314. The door 316 may rotate or otherwise move to a closed position (not shown) to enclose the tray assembly 120 during one or more operations, such as a tag writing and/or a laser etching operation.

In some implementations, the display 312 is positioned on a portion of the door 316. Such configuration may make the display 312 more easily accessible to the user. In some implementations, the door 315 includes a window, such as a transparent window, that allows a user to view the laser etching operation and/or the tag writing operation from a position external to the machine 310.

Figure 4:
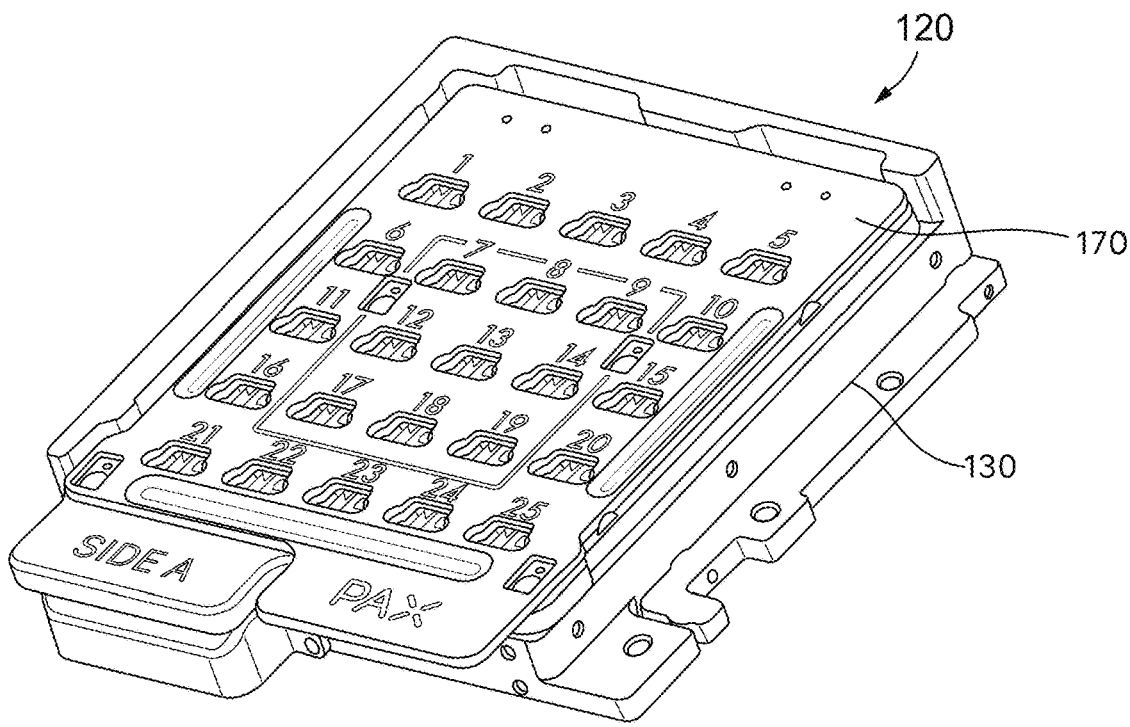
FIG. 4 illustrates an example tray assembly consistent with implementations of the current subject matter.

FIG. 4 illustrates an example of the tray assembly 120, consistent with implementations of the current subject matter. The tray assembly 120 includes a nest 130 and a tray 170. The nest 130 may receive and secure at least a portion of the tray 170. For example, the nest 130 may include a frame 138 (see FIGS. 5 and 6). The frame 138 includes one or more (e.g., two or more) side walls 131 that may surround at least a portion of the tray 170 when assembled. The side walls 131 may also allow for the tray 170 to be easily accessed, removed from and/or positioned within the nest 130, and/or may position the tray 170 in the proper location within the enclosure 114 of the machine 110 during use.

Figure 5:
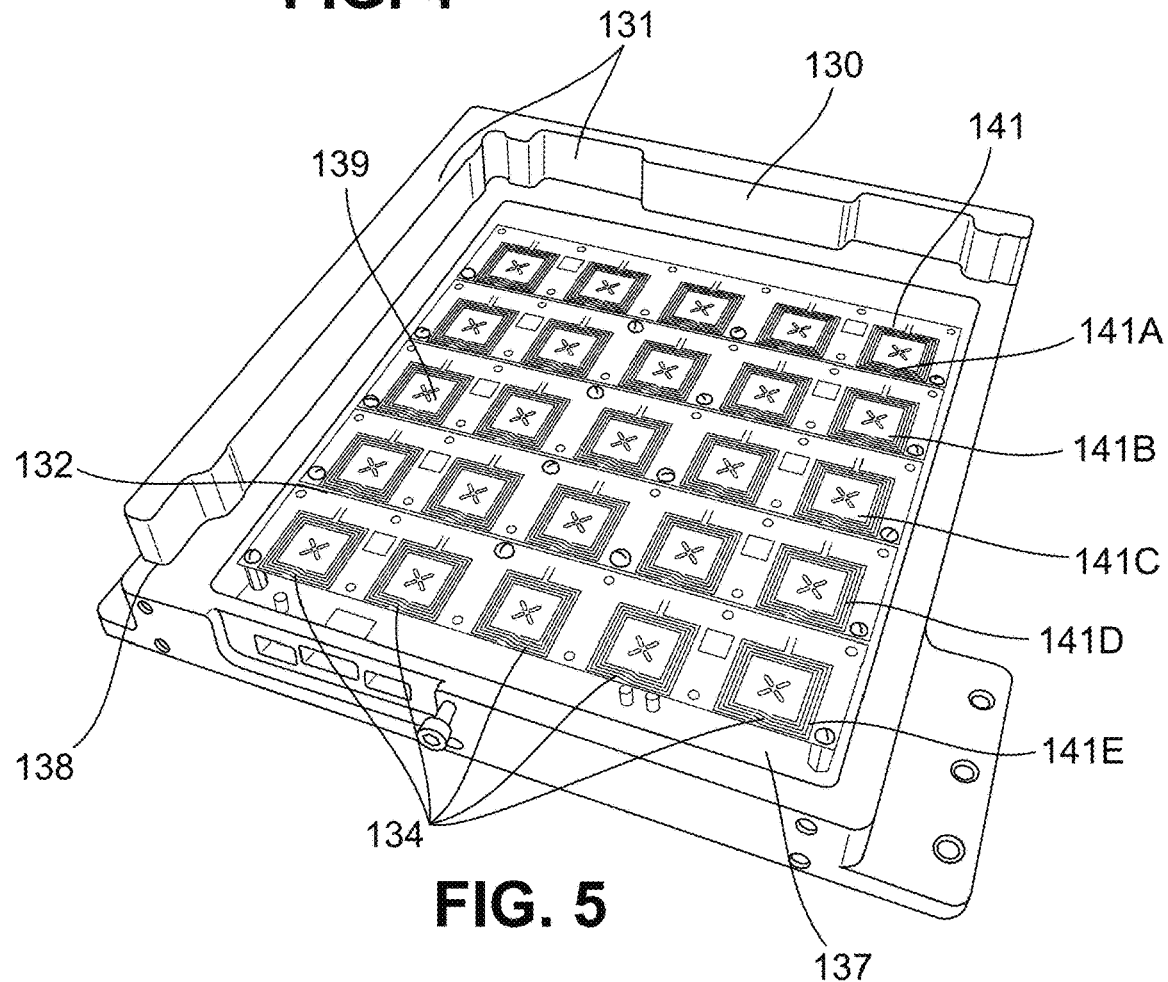
FIG. 5 illustrates an example nest of a tray assembly consistent with implementations of the current subject matter.
Figure 6:
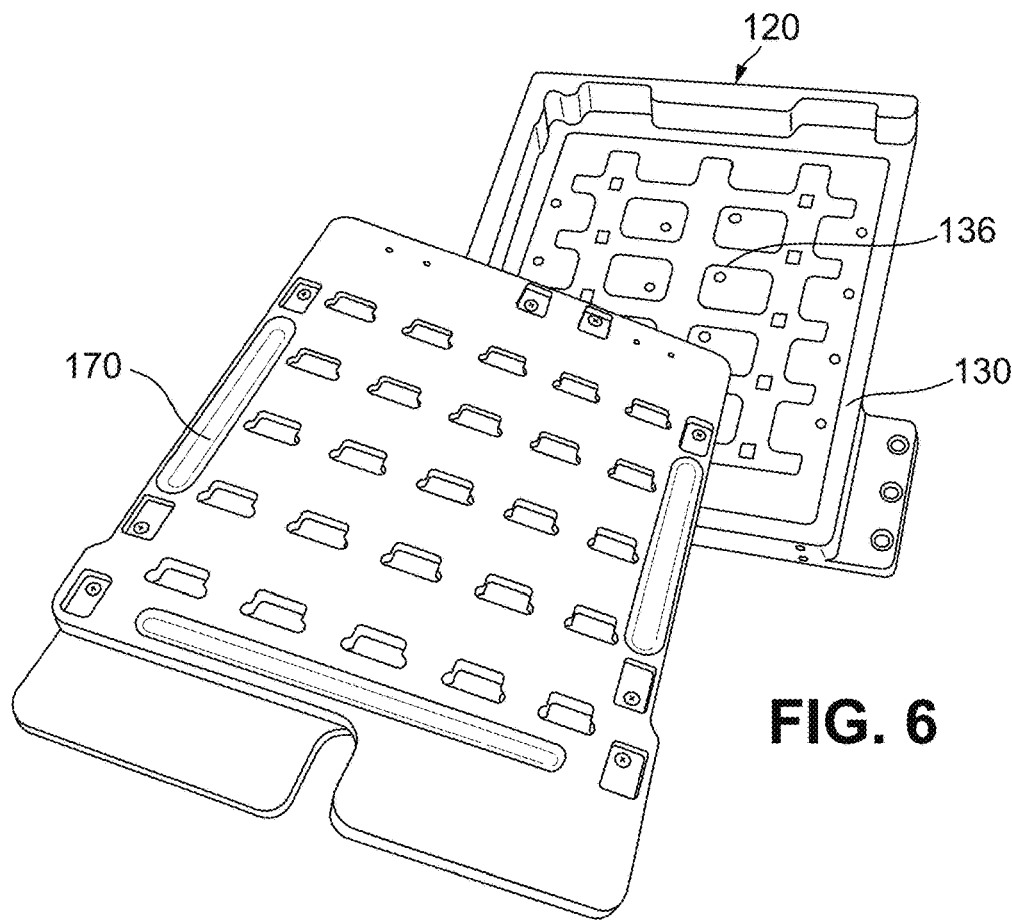
FIG. 6 illustrates an exploded view of an example tray assembly consistent with implementations of the current subject matter.

FIGS. 5 and 6 illustrates an example of the nest 130, consistent with implementations of the current subject matter. The nest 130 may include one or more (e.g., one, two, three, four, five, six, or more) substrates 132. The substrates 132 may include a printed circuit board (PCB) 137 and one or more (e.g., one, two, three, four, five, six, or more) mezzanine boards 141 coupled to the PCB 137. The one or more mezzanine boards 141 may be positioned over and/or be supported by the PCB 137. For example, the one or more mezzanine boards 141 may face away from the PCB 137. The one or more substrates 132 may include wireless communication circuitry (such as the wireless communication circuitry 104). The wireless communication circuitry of the one or more substrates 132 may include one or more near-field communication (NFC) antennas that are configured to read from and/or write cartridge data to the tag 164 of each cartridge 150. The wireless communication circuitry may additionally and/or alternatively detect a cartridge 150 positioned over the antenna and/or that the cartridge 150 is properly positioned over the antenna to receive the cartridge data from the antenna.

For example, at least a portion of the substrate 132 may include one or more (e.g., one, two, three, four, five, or more) antenna traces 134 (also referred to herein as "antennas" 134). The antennas 134 may be etched in the substrate 132, such as in the mezzanine boards 141, and face away from the PCB 137, such as towards an interior volume of the nest 130 and/or towards the tray 170 when the tray 170 is positioned within the nest 130. Etching the antennas 134 in the substrate 132 may help to simplify manufacturing of the nest 130.

The antennas 134 may write the cartridge data, such as the cartridge data described herein, to the tag 164 of each of the cartridges 150 held within the tray 170. The antennas 134 may thus wirelessly connect the tag 164 with the display 112 (or client device or other data store). This allows cartridge data to be selected, input, and/or generated at the display 112 on the machine 110 and/or at an external client device and be written to the cartridges 150.

As an example, as shown in FIG. 5, the nest 130 may include at least five mezzanine boards 141A, 141B, 141C, 141D, 141E. Each of the substrates 141A, 141B, 141C, 141D, 141E may be positioned adjacent to one another. In some implementations, each of the substrates 141A, 141B, 141C, 141D, 141E includes five antennas 134 that are etched into the substrates 141A, 141B, 141C, 141D, 141E and are spaced apart from one another. Each of the antennas 134 may be spaced apart by an equal distance. The position of each antenna 134 may correspond to a position of a cartridge when the cartridge 150 is held within the tray 170 and positioned within the nest 130 such that each cartridge 150 is aligned with a single antenna 134. In other implementations, the nest 130 includes a single substrate 132 on which all of the antenna traces 134 are etched, a single substrate 132 on which each of the antenna traces 134 are etched, and/or another suitable configuration.

For example, the antennas 134 may be arranged as an array of antennas 139. The array of antennas 139 is located within the nest 130 such that each of the antennas 134 of the array of antennas 139 aligns with one cartridge 150 (or a cartridge retainer of the tray) when the tray assembly 120 is assembled (e.g., when the tray 170 is properly positioned within the nest 130). This configuration helps to reduce the likelihood or otherwise prevent incorrect data from being written to the incorrect tag 164 of each cartridge 150 positioned within the tray 170. Thus, the array of antennas may help to ensure a 1:1 match between antennas 134 and tags 164 of the cartridges 150. Such configurations may help to reduce or eliminate cross-communication between different cartridges 150 held within the tray 170. Such configurations may also help to improve the accuracy of writing data to the tags of cartridges, and may help to ensure that the correct data is written to the correct cartridge. This helps ensure to ensure that the tag of the cartridge provides accurate information to the user about, for example, the vaporizable material stored within the cartridge, and/or the like. Such configuration may result in an improved user experience.

As shown in FIG. 6, the nest 130 may additionally include a substrate cover 136 which may be positioned over one or more (or all) of the substrates 132. The substrate cover 136 may be made of plastic or another material. The material of the substrate cover 136 does not interfere with the data transfer between the antennas 134 and the tags 164 of the cartridges 150. The substrate cover 136 may prevent or limit damage caused to the antennas 134, such as when the tray 170 is removed and/or positioned over the antennas 134. The substrate cover 136 may be removably attached to the frame 138 to provide access to the antennas 134. In other implementations, the substrate cover 136 may be permanently secured to the frame 138 over the substrates 139.

Figure 7:
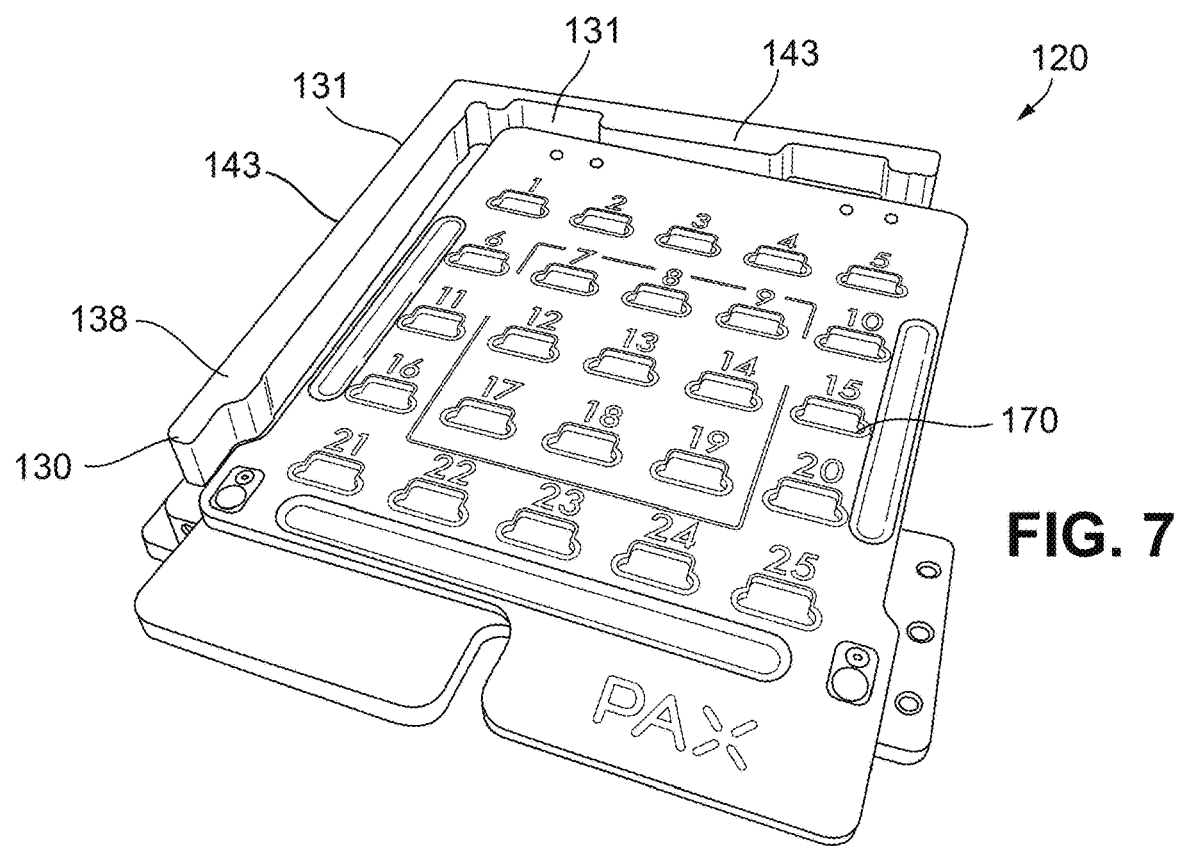
FIG. 7 illustrates an example tray assembly consistent with implementations of the current subject matter.

FIG. 7 illustrates an example of the tray assembly 120, consistent with implementations of the current subject matter. The tray assembly 120 includes the nest 130 and the tray 170. As shown in FIG. 7, the tray 170 is positioned within or otherwise coupled to the nest 130. As noted above, the side walls 131 of the frame 138 properly locate the tray 170 relative to the nest 130. The tray 170 may be properly located within the nest 130 when one or more sides of the tray 170 contact one or both of the side walls 131. The tray 170 may also be properly located within the nest 130 when each of the cartridge retainers of the tray (described in more detail below) are aligned with each of the antennas 134 of the antenna array 139. In some implementations, the nest 130 includes one or more magnetic elements or magnets 143 to magnetically retain the tray 170 within the nest 130. For example, the tray 170 may include one or more corresponding magnetic elements or be made of a magnetic material. Thus, the tray 170 may couple (e.g., magnetically couple) with the magnets 143 to retain the tray 170 in the proper position relative to the nest 130. This may also allow the tray 170 to be pulled into the proper position relative to the nest 130 when the tray 170 is placed on or near the frame 138 of the nest 130.

FIGS. 8-18 illustrate an example of the tray 170, consistent with implementations of the current subject matter. The tray 170 may hold, secure, and/or position one or more (e.g., one, two, three, four, five, ten, fifteen, twenty, twenty-five, or more) cartridges 150. In some implementations, the tray 170 positions the cartridges 150 within the machine 110 so that the cartridges 150 are properly positioned for one or more operations performed by the machine 110, such as laser etching and/or tag writing. In some implementations, the tray 170 allows for higher throughput of the machine 110 by allowing for each cartridge of a batch or array of cartridges to be rotated at the same time during a laser etching and/or tag writing operation. For example, the tray 170 may allow for a greater number of cartridges 150 to be processed by the machine 110 within a shorter amount of time. As noted above, in some implementations, the tray 170 may also help to reduce and/or eliminate the likelihood that the tag 164 of the cartridge 150 will be written with the incorrect cartridge data. In other words, the tray 170 may improve the accuracy and speed of writing data to the tag 164 of each cartridge 150 held by the tray 170, as other alignment means (e.g., manual alignment) would be unnecessary.

In some implementations, the tray 170 allows for the machine 110 (e.g., the antennas 134) to write to the tag 164 of each cartridge 150 held by the tray 170 during, before, or after the machine 110 laser etches one, two, or more sides of each cartridge 150. This allows for the process of preparing the cartridges 150 to be completed more efficiently, in less time, and with improved accuracy. This may also significantly reduce the cost of preparing the cartridges 150 and allow for a greater number of cartridges 150 to be prepared to be sold by a distributor.

FIGS. 8-12 illustrate an example of the tray 170 in the closed position, consistent with implementations of the current subject matter. The tray 170 includes a first cartridge positioner 172 and a second cartridge positioner 174. The first cartridge positioner 172 and the second cartridge positioner may each form a separate half of the tray 170 that encloses and/or hold at least one cartridge. The example tray 170 shown in FIGS. 8-18 may hold up to 25 cartridges 150. In other implementations, the tray 170 may hold 1 to 5, 5 to 10, 10 to 15, 15 to 20, 20 to 25, 25 to 30, 30 to 35 or more cartridges 150. In some implementations, the tray 170 may hold an array of cartridges. The array of cartridges includes one, two, three, four, or five or more rows of cartridges and one, two, three, four, or five or more columns of cartridges. This allows multiple cartridges 150 to be processed by the machine 110 more quickly and allows for all of the cartridges 150 to be rotated at the same time during a laser etching operation.

The first cartridge positioner 172 may be coupled to the second cartridge positioner 174. In some implementations, the first cartridge positioner 172 is coupled to the second cartridge positioner 174 at a distal end 177 of each of the first cartridge positioner 172 is coupled to the second cartridge positioner 174. For example, the first cartridge positioner 172 and the second cartridge positioner 174 may be rotatably coupled by a hinge 176. In other implementations, the first cartridge positioner 172 and the second cartridge positioner 174 are coupled via other means, such as a snap-fit arrangement, mechanical fastener, and/or the like. The hinge 176 allows the first cartridge positioner 172 to be rotated relative to the second cartridge positioner 174 and/or the second cartridge positioner 174 to be rotated relative to the first cartridge positioner 172. This configuration may provide easy access to the interior of the tray 170 in which the cartridges are held and loaded into.

In some implementations, each of the first cartridge positioner 172 and the second cartridge positioner 174 include a tab 178. The tab 178 may be positioned along at least a portion of a distal end 177 of each of the first cartridge positioner 172 and the second cartridge positioner 174. The tab 178 may help to allow for the tray 170 to be opened more easily. For example, the tab 178 on each of the first cartridge positioner 172 and the second cartridge positioner 174 may allow for the first cartridge positioner 172 to be rotated relative to the second cartridge positioner 174 (or vice versa) more easily and/or quickly. In some implementations, the tab 178 includes a tab indicator 178A that provides information, such as an orientation, about the first cartridge positioner 172 and the second cartridge positioner 174. For example, the tab indicator 178A may indicate which of the first cartridge positioner 172 and the second cartridge positioner 174 is facing towards and/or away from the user, the laser 155, the nest 130, and/or the like.

In some implementations, each of the first cartridge positioner 172 and the second cartridge positioner 174 include one or more positioner openings 180. The positioner openings 180 are formed through each of the first cartridge positioner 172 and the second cartridge positioner 174. The positioner openings 180 provide access to the interior of the tray 170 in which the cartridges 150 are held. In some implementations, each of the first cartridge positioner 172 and the second cartridge positioner 174 includes a positioner opening 180 that corresponds to each cartridge 150 held by the tray 170 and/or each cartridge retainer (described in more detail below) of the tray 170. Thus, each of the first cartridge positioner 172 and the second cartridge positioner 174 may include 25 positioner openings 180. In other implementations, each of the first cartridge positioner 172 and the second cartridge positioner 174 may include 1 to 5, 5 to 10, 10 to 15, 15 to 20, 20 to 25, 25 to 30, 30 to 35 or more positioner openings 180. The positioner openings 180 may be positioned in rows (e.g., one, two, three, four, five, or more rows) or another pattern along each of the first cartridge positioner 172 and the second cartridge positioner 174. For example, the positioner openings 180 may form an array of positioner openings 180. In the array of positioner openings shown in FIGS. 8-12, the positioner openings 180 are positioned spaced apart from one other in five rows each having five columns.

The positioner openings 180 are arranged such that each positioner opening 180 aligns with at least a portion of each cartridge 150, such as a first portion 107A of cartridge and/or a second portion of a cartridge 107B, on which the laser 155 etches cartridge data. In some implementations, the positioner openings 180 allow access, by the laser 155, to only the portion of the cartridge 150 on which the laser 155 etches the cartridge data. In other words, a perimeter of the positioner openings 180 may define the bounds of an area of a cartridge that may be laser etched by the laser 155. For example, the positioner openings 180 may be surrounded by a solid portion of each of the first cartridge positioner 172 and the second cartridge positioner 174. As a result, the laser 155 may only etch the portion of the cartridge 150 that is accessible through the positioner openings 180, while the laser 155 may not be able to laser etch another portion of the cartridge 150 that is inaccessible through the positioner openings 180. Accordingly, the positioner openings 180 may define laser guides that guide the laser 155 to etch the proper portion of the cartridge 150.

Figure 12:
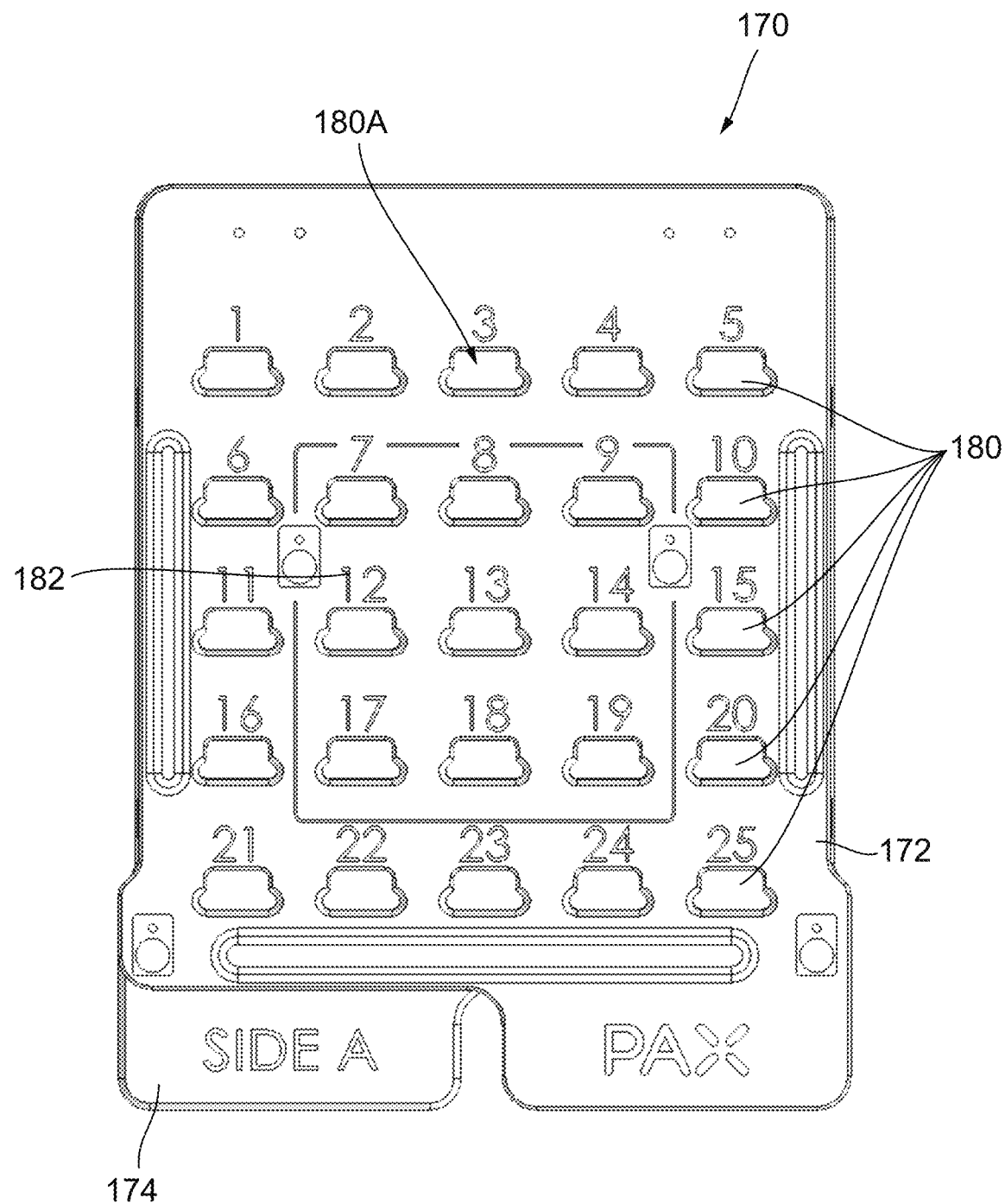

Referring to FIG. 12, which shows a top view of the tray 170, the positioner openings 180 of each of the first cartridge positioner 172 and the second cartridge positioner 174 may be aligned with one another. For example, the positioner openings 180A of the first cartridge positioner 172 and the positioner openings 180B of the second cartridge positioner 174 may be aligned along an axis that extends from the outer surface of the first cartridge positioner 172 to the outer surface of the second cartridge positioner 174 and is approximately perpendicular to the outer surface of the first cartridge positioner 172 to the outer surface of the second cartridge positioner 174 when the tray 170 is in the closed position (e.g., when the first cartridge positioner 172 and the second cartridge positioner 174 are parallel to one another). Such configurations allow the tray 170 to be rotated 180 degrees about a central longitudinal axis that extends from the distal end 177 to the proximal end 175 of the tray 170 during, for example, the laser etching operation. In some implementations, the tray 170 is rotated approximately 45 degrees to 90 degrees, 90 degrees to 135 degrees, 135 degrees to 180 degrees, 180 degrees to 225 degrees, 225 degrees to 270 degrees, 270 degrees to 315 degrees, 315 degrees to 360 degrees, 175 to 185 degrees, 179 to 181 degrees, 45 degrees, 90 degrees, 135 degrees, 180 degrees, 225 degrees, 270 degrees, 315 degrees, 360 degrees, and/or other ranges threrebetween. Rotation of the tray 170 would allow the laser 155 to maintain the same alignment, pattern, and/or sequence during the laser etching operation when etching each side of the cartridge 150 that is accessible through the positioner openings 180.

In some implementations, the tray 170 has rotational symmetry about the central longitudinal axis. For example, the overall appearance of the tray 170 may be the same or similar in a first orientation, in which the outer surface of the first cartridge positioner 172 faces towards the laser 155 or faces away from the nest 130 when assembled with the machine 110 and/or nest 130, and a second orientation, in which the outer surface of the second cartridge positioner 174 faces the laser 155 and/or away from the nest 130 when assembled with the machine 110 and/or nest 130.

Figure 8:
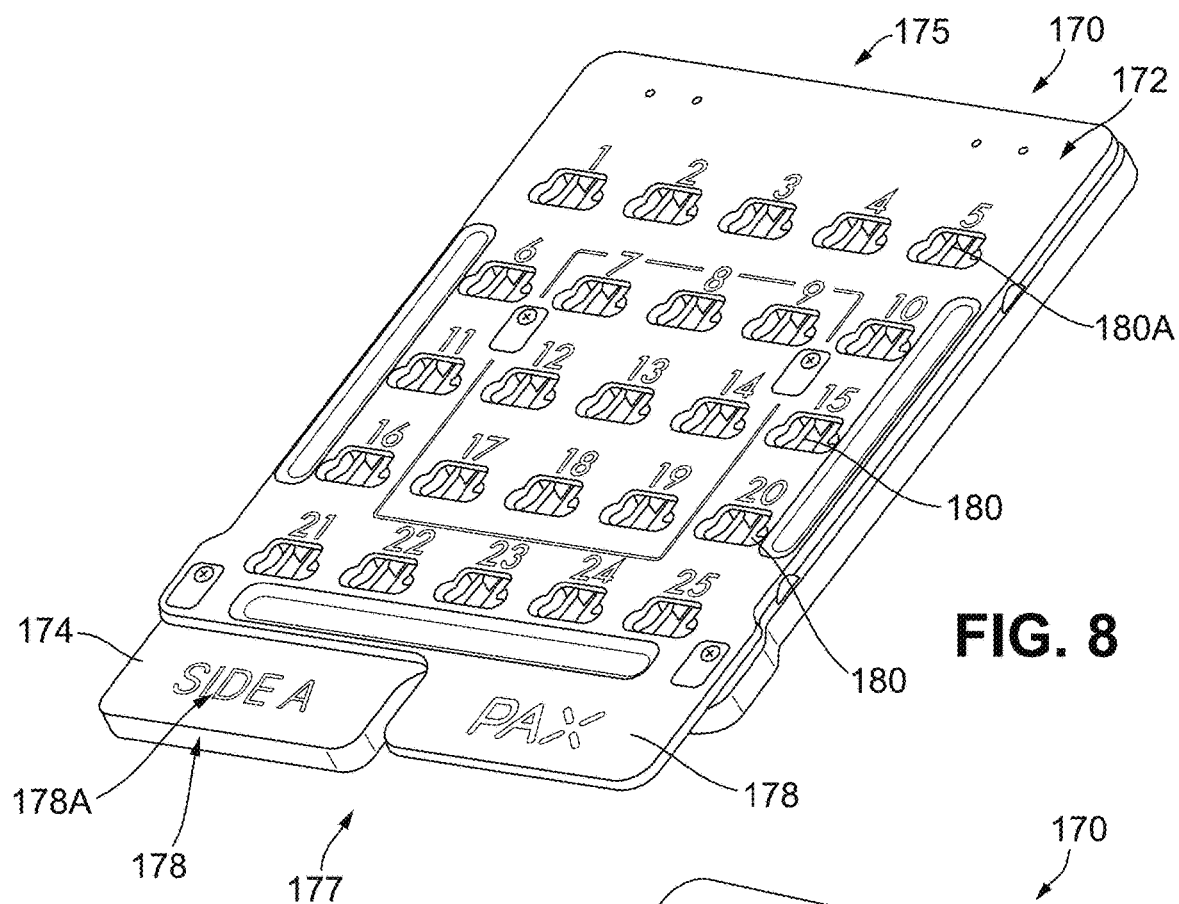
FIGS. 8-12 illustrate an example tray of a tray assembly in a closed position consistent with implementations of the current subject matter.
Figure 9:
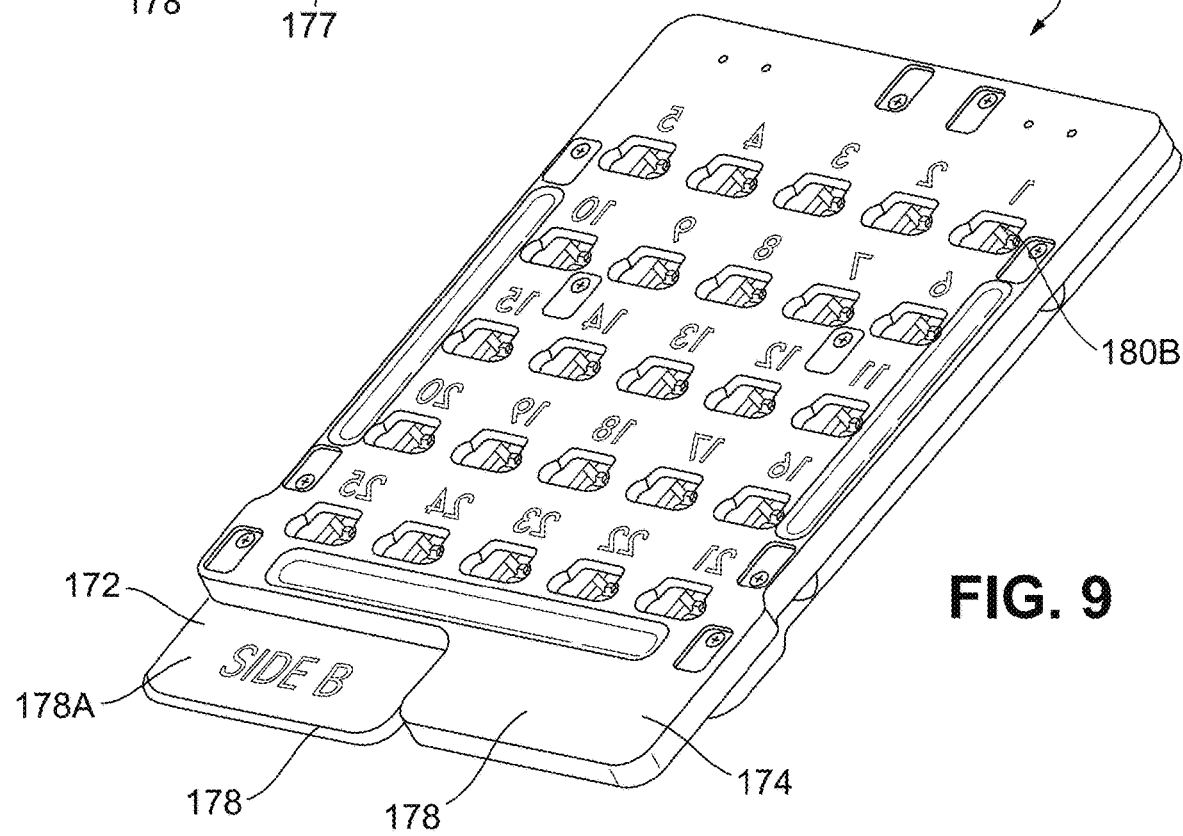
Figure 10:
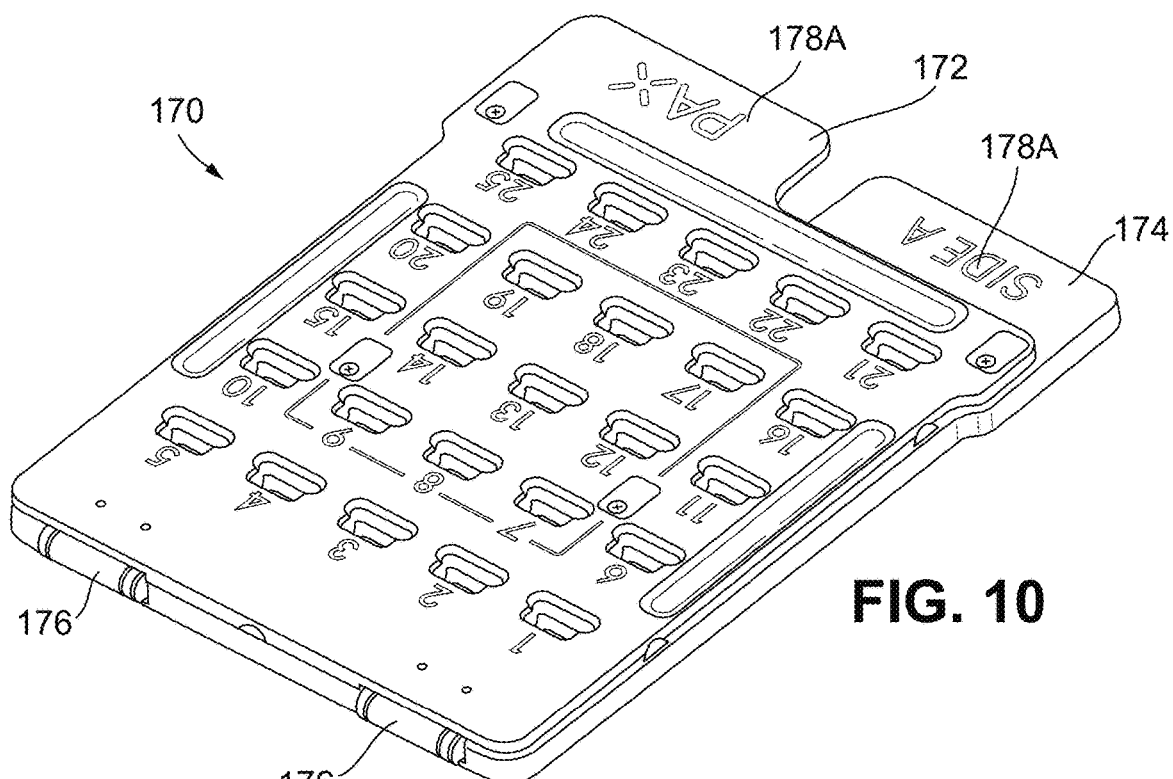
Figure 11:
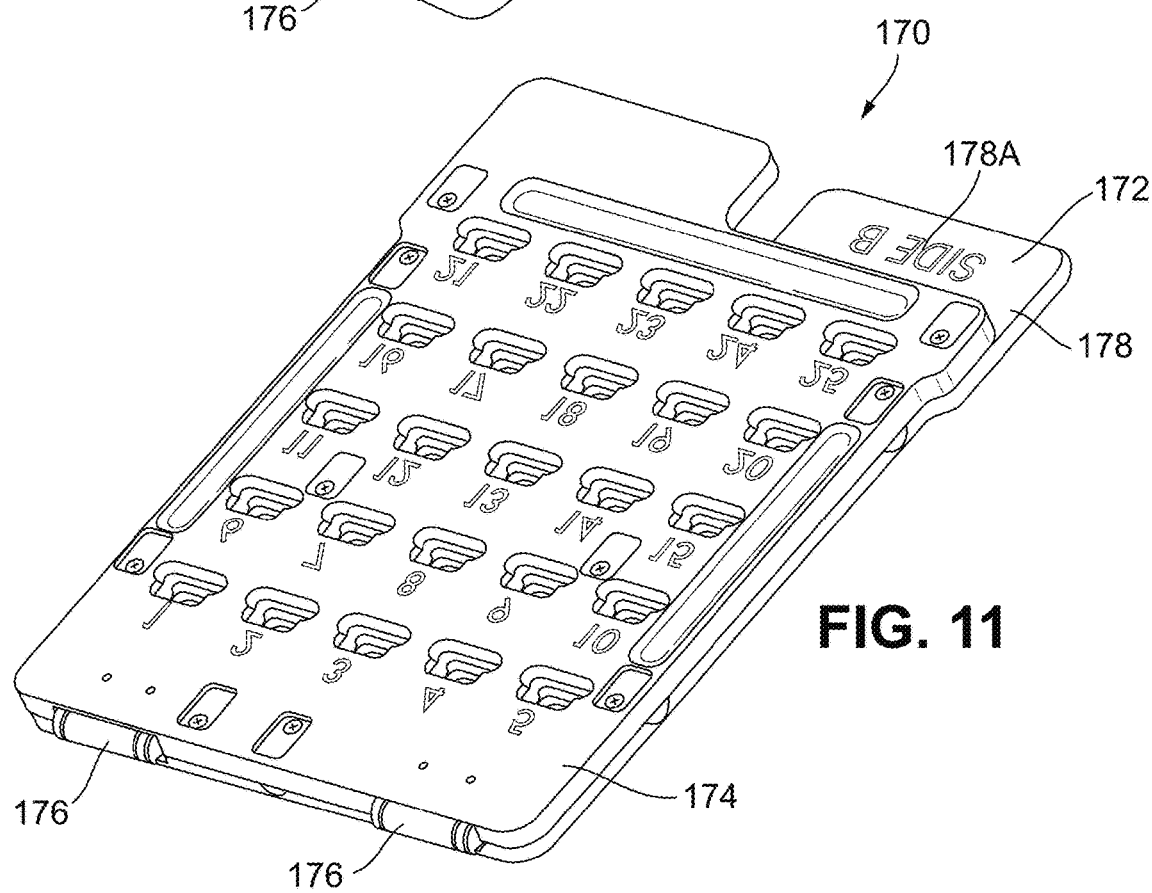

As shown in at least FIGS. 8 and 12, the tray 170 includes one or more positional indicators 182. The positional indicators 182 may include a number, letter, or other indicator that indicates the location of the particular positioner opening 180 (and cartridge 150 aligned with the positioner opening 180). Additionally and/or alternatively to the laser guides, the positional indicators 182 may help to guide the laser 155 when etching the cartridge data onto the cartridges 150. In some implementations, the machine 110 may receive an input, such as via the display 112, which indicates the position of a cartridge 150 to be etched and/or a sequence in which the cartridges 150 held within the tray 170 are to be etched. The position of the cartridge 150 may be indicated by the positional indicator 182 corresponding to the positioner opening 180 through which the particular cartridge 150 may be accessed.

Figure 13:
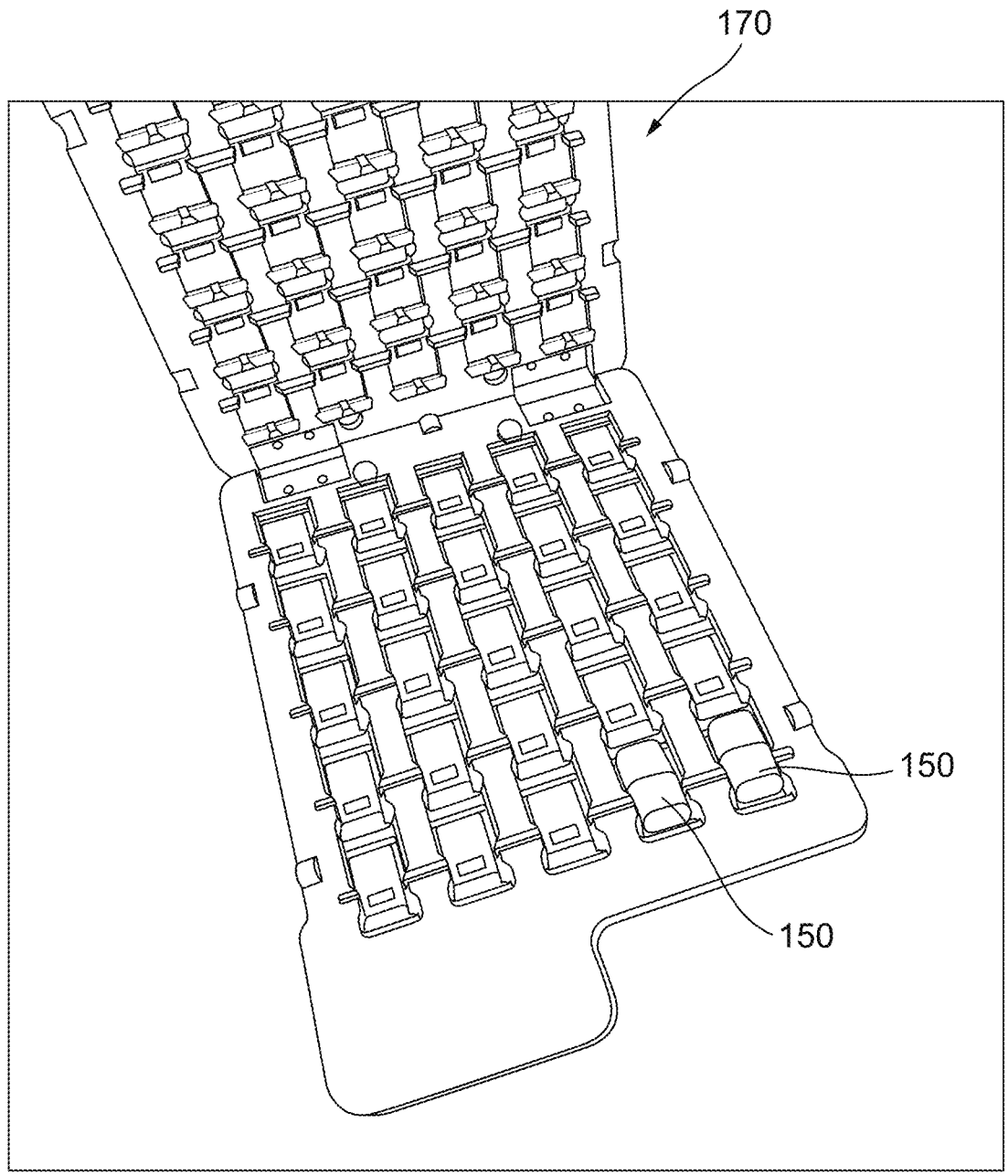
FIGS. 13 and 14 illustrate an example tray of a tray assembly in an opened position consistent with implementations of the current subject matter.
Figure 14:
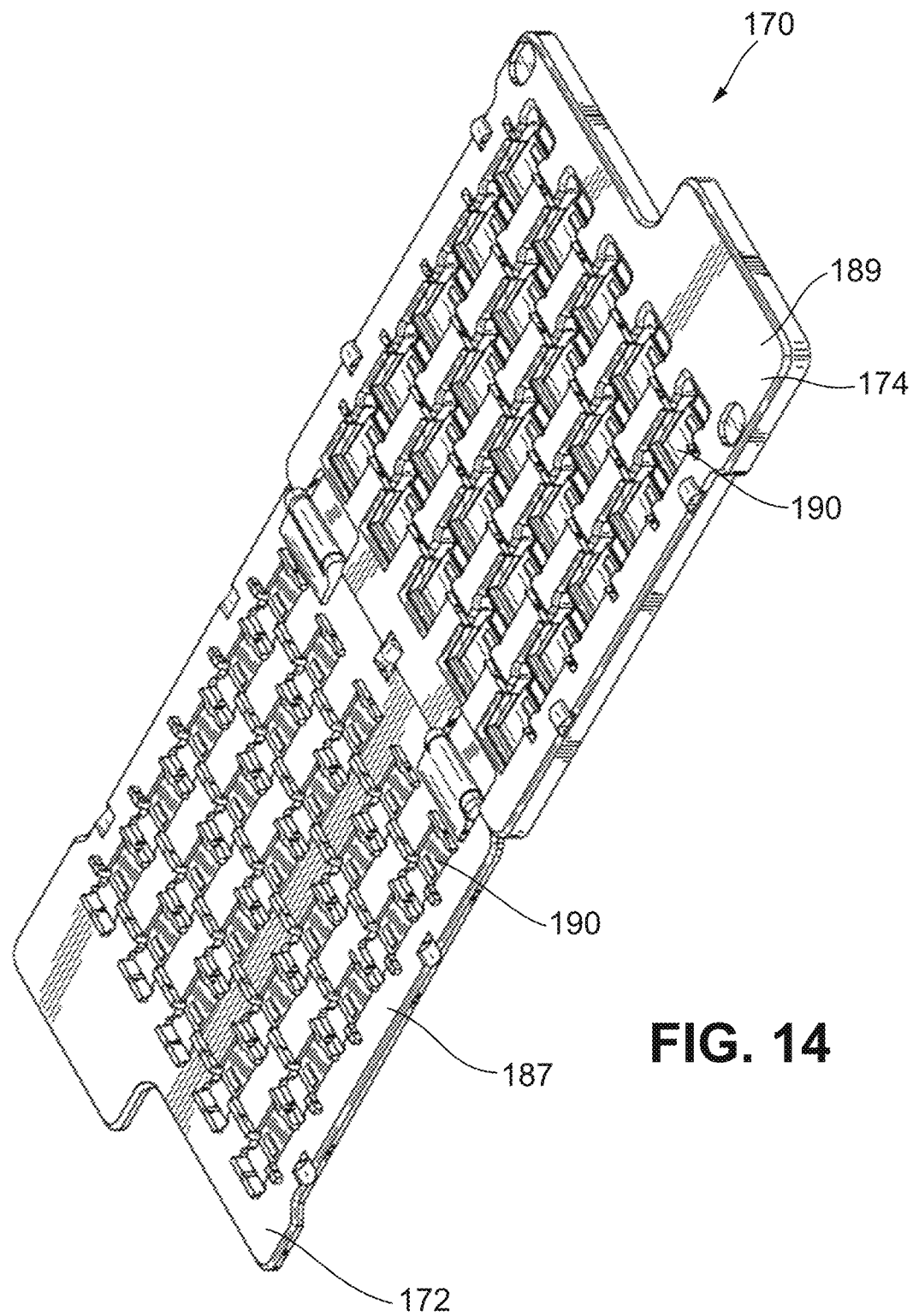
Figure 15:
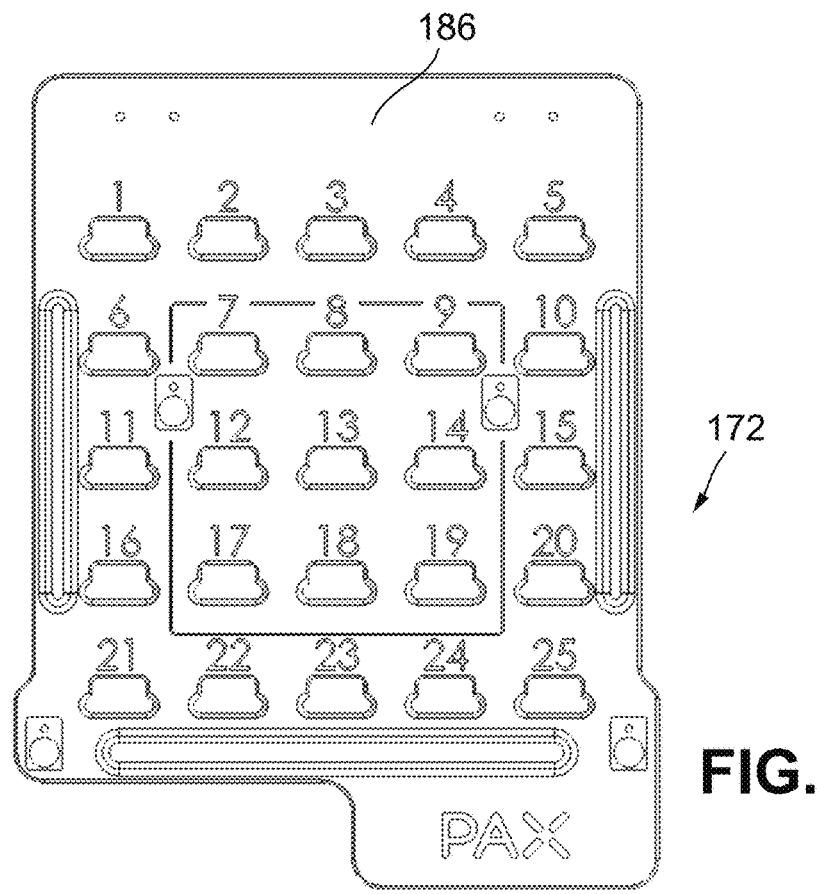
FIGS. 15 and 16 illustrate an example first positioner of a tray consistent with implementations of the current subject matter.
Figure 16:
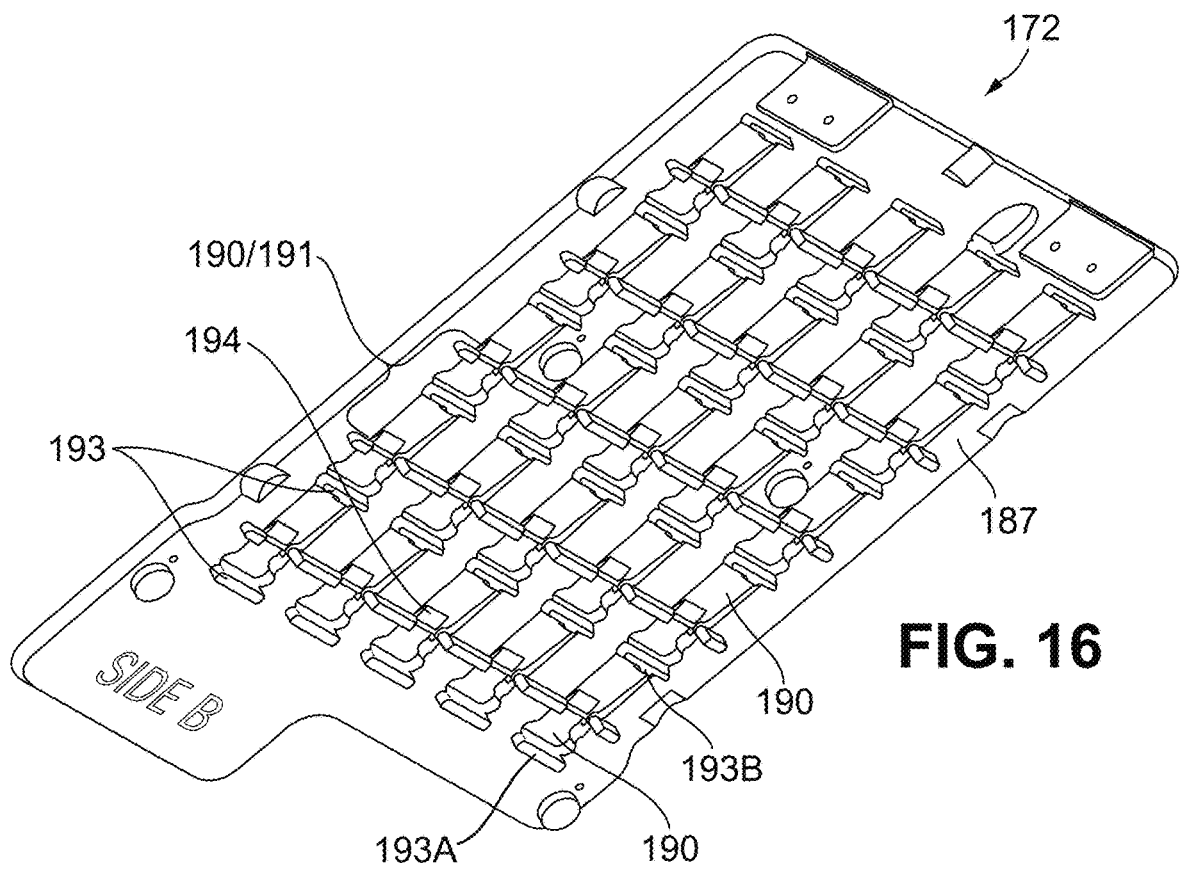
Figure 17:
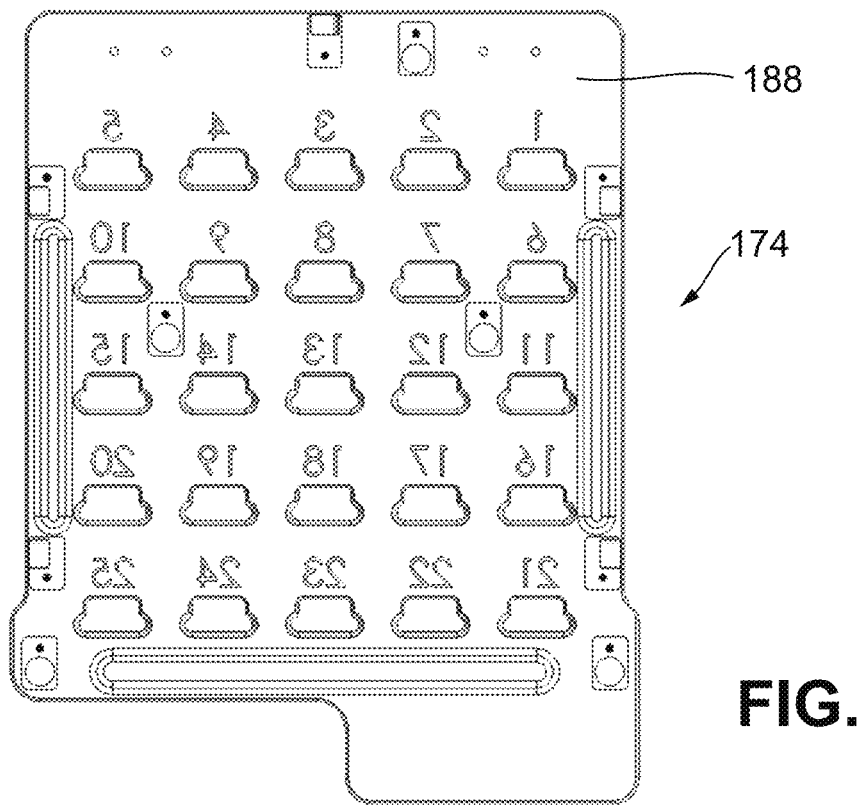
FIGS. 17 and 18 illustrate an example second positioner of a tray consistent with implementations of the current subject matter.
Figure 18:
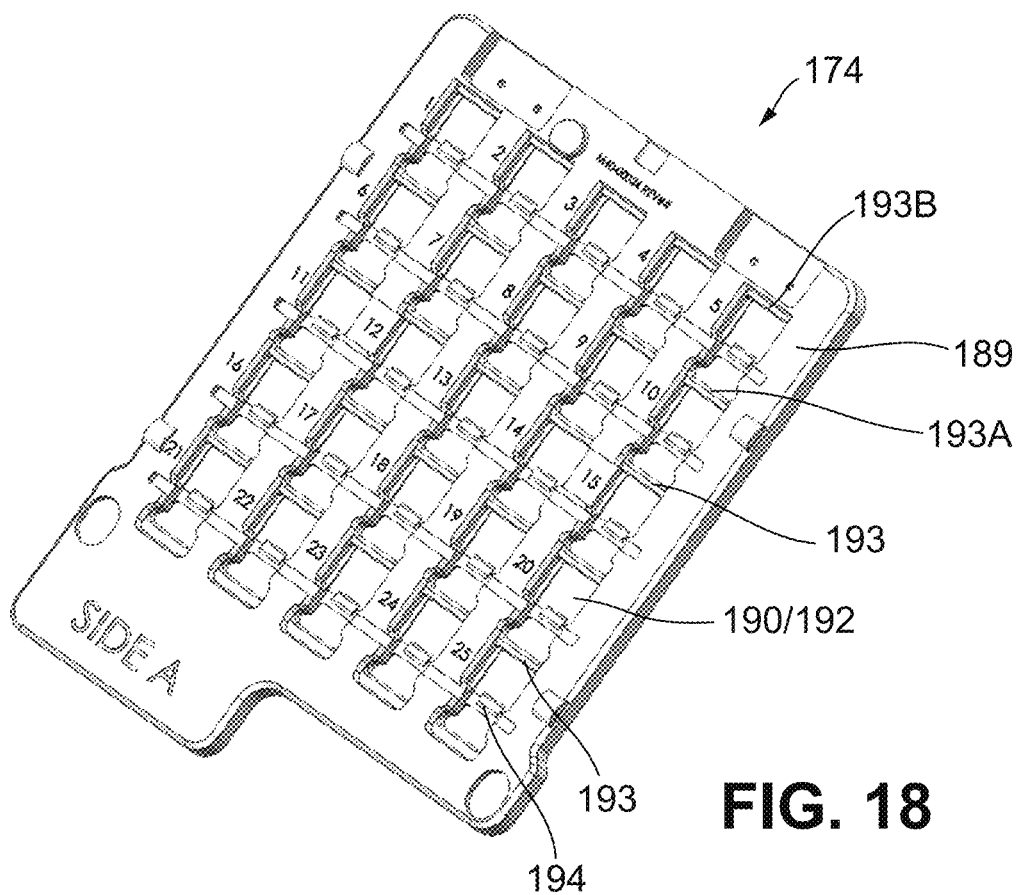

FIGS. 13 and 14 illustrate an example of the tray 170 in the opened position, with two cartridges 150 shown as being held by the tray 170 in FIG. 13. FIG. 15 illustrates an example of the first cartridge positioner 172, showing an outer surface 186 of the first cartridge positioner 172, FIG. 16 illustrates another example of the first cartridge positioner 172, showing an inner surface 187 of the first cartridge positioner 172, FIG. 17 illustrates an example of the second cartridge positioner 174, showing an outer surface 188 of the second cartridge positioner 174, and FIG. 18 illustrates an example of the second cartridge positioner 174, showing an inner surface 189 of the second cartridge positioner 174. The tray 170 may be in the opened position, when the first cartridge positioner 172 and the second cartridge positioner 174 are not parallel relative to one another. For example, the tray may be in the opened position, when the first cartridge positioner 172 and the second cartridge positioner 174 are at an angle relative to one another (see FIG. 13), or are aligned along a plane (see FIG. 14).

In some implementations, each of the first cartridge positioner 172 and the second cartridge positioner 174 include one or more cartridge retainers 190 along an interior of each of the first cartridge positioner 172 and the second cartridge positioner 174. The cartridge retainers 190 defines slots in the first cartridge positioner 172 and/or the second cartridge positioner 174 that receive and retain the cartridge 150 when the cartridge is held by the tray 170. In some implementations, one half of each of the cartridge retainers 190 (e.g., a first portion 191 of the cartridge retainer 190) is positioned along the inner surface 187 of the first cartridge positioner 172. In some implementations, the opposing half of each of the cartridge retainers 190 (e.g., a second portion 192 of the cartridge retainer 190) is positioned along the inner surface 189 of the second cartridge positioner 174. The first portion 191 and the second portion 192 of each cartridge retainer 190 defines a slot in which each cartridge 150 may reside. For example, the first portion 191 of each cartridge retainer 190 may be shaped to receive and/or secure at least a portion, such as a first side 150A, of the cartridge 150, and the second portion 192 of each cartridge retainer 190 may be shaped and/or sized to receive and/or secure at least a portion, such as a second opposing side 150B, of the cartridge 150.

As shown in at least FIGS. 13-18, each cartridge retainer 190 may include a corresponding positioner opening 180 on the first cartridge positioner 172 and a corresponding positioner opening 180 on the second cartridge positioner 174. For example, the first portion 191 of each cartridge retainer 190 may include a first cartridge positioner opening 180A and the second portion 192 of each cartridge retainer 190 may include the opposing second cartridge positioner opening 180B. As such, when the cartridge 150 is positioned within the cartridge retainer 190, a portion of the first side 150A of the cartridge 150 is accessible to be laser etched through the corresponding first cartridge positioner opening 180A and a portion of the second side 150B of the cartridge 150 is accessible to be laser etched through the corresponding second cartridge positioner opening 180B.

In some implementations, each cartridge retainer 190 also includes two dividers 193. The dividers 193 include a proximal divider 193B and a distal divider 193A. The proximal divider 193B is configured to form a distal wall of each cartridge retainer 190 that is configured to contact and/or retain at least the distal end of the cartridge body 156 within the cartridge retainer 190. The proximal divider 193B is configured to form a proximal wall of each cartridge retainer 190 that is configured to contact and/or retain at least the proximal end of the cartridge 150, such as an end of the mouthpiece of the cartridge, within the cartridge retainer 190. In some implementations, the distal divider 193A and/or the proximal divider 193B may serve both functions. For example, when a divider 193 is positioned between two longitudinally spaced cartridges 150 (e.g., cartridges that are positioned such that a mouthpiece of one cartridge is adjacent to a distal end of another cartridge), the divider 193 is the proximal divider 193B of one cartridge 150 and the divider 193 is the distal divider 193A of the other cartridge 150. Each divider 193 also spaces each of the cartridges apart from one another in a longitudinal direction (e.g., in a proximal-distal direction).

In some implementations, as shown in at least FIGS. 16 and 18, each cartridge retainer 190 may include a securement feature 194. The securement feature 194 may be an angled protrusion that extends from an inner surface of each cartridge retainer 190 (of both the first portion 191 and the second portion 192 of each cartridge retainer 190). The securement feature is configured to contact at least a portion of both sides of the cartridge 150 when the cartridge 150 is held within the tray 170. For example, the securement feature 194 may contact at least first side 150A and the second side 150B of the mouthpiece of the cartridge 150 when the cartridge 150 is held by the tray 170 and the tray 170 is in the closed position. The securement feature 194 may press against the sides of the cartridge 150 to lock the cartridge 150 into place within each cartridge retainer 190.

FIG. 20 illustrates an example method 200 for laser etching and/or writing data to one or more cartridges, such as the cartridges 150.

In some implementations, the machine (e.g., the machine 110, 310) may be initialized. For example, a display screen that forms a part of the machine and/or forms a part of a separate device that communicates with the machine may receive one or more inputs. In some implementations, one or more vaporizer cartridges (e.g., the cartridges 150) may be loaded onto and/or otherwise held by a tray (e.g., the tray 170) of the machine. The machine may receive an indication from a tag, such as the tag 164, to perform a first laser etching operation. For example, the machine (e.g., via the controller) may read a tag identifier, determine whether the tag identifier is valid, write data to the tag, verify the tag identifier, and/or the like.

At 202, the machine, such as by a controller (e.g., the controller 128) and/or after receiving an indication from a tag (e.g., the tag 164) may perform a first laser etching operation. The first laser etching operation may include laser etching a first set of cartridge data (e.g., any of the cartridge data described herein, such as data relating to a vaporizable material stored in each of the vaporizer cartridges) onto a first side of each vaporizer cartridge of an array of vaporizer cartridges. As discussed in more detail with respect to FIGS. 1-19B, the array of vaporizer cartridges may be held within a tray (e.g., the tray 170). The tray may enclose each vaporizer cartridge of the array of vaporizer cartridges. In some implementations, each vaporizer cartridge includes an NFC tag. In some implementations, the controller may indicate an order, sequence, or pattern in which the cartridge data should be etched.

In some implementations, the first laser etching operation is performed by a laser of the machine. The laser may perform the first laser etching operation by, for example, laser etching the first set of cartridge data onto the first side of the cartridge that is accessible through a positioner opening (e.g., the positioner opening 180) of the tray, such as a positioner opening located on a first cartridge positioner (e.g., the first cartridge positioner 172) of the tray. In some implementations, the controller and/or one or more sensors may detect whether a cartridge is positioned within and/or properly positioned within a cartridge retainer before performing the first laser etching operation. The controller may reads an identifier (e.g., a unique identifier) on the NFC tag of each vaporizer cartridge prior to laser etching each vaporizer cartridge to detect whether a vaporizer cartridge is positioned within a particular cartridge retainer. This allows the machine to skip over cartridge retainers in which no vaporizer cartridge is positioned. Additionally and/or alternatively, the machine may read the tag identifier and/or data stored on the tag to determine whether the tag is valid. The machine may perform the first laser operation on the vaporizer cartridge having a valid tag identifier (e.g., after determining that the tag identifier is valid) and/or may not perform the first laser operation if the machine determines that the tag identifier is not valid.

At 204, the tray may be rotated (or flipped) 180 degrees about a central longitudinal axis of the tray to provide access to an opposing second side of each vaporizer cartridge through the tray (e.g., through an opposing positioner opening positioned on a second cartridge positioner, such as the second cartridge positioner 174, of the tray). In some implementations, the tray is rotated approximately 45 degrees to 90 degrees, 90 degrees to 135 degrees, 135 degrees to 180 degrees, 180 degrees to 225 degrees, 225 degrees to 270 degrees, 270 degrees to 315 degrees, 315 degrees to 360 degrees, 175 to 185 degrees, 179 to 181 degrees, 45 degrees, 90 degrees, 135 degrees, 180 degrees, 225 degrees, 270 degrees, 315 degrees, 360 degrees, and/or other ranges threrebetween. In some implementations, the machine and/or a separate accessory system may rotate the tray. The tray may be rotated upon completion of the first laser etching operation in some implementations. The central longitudinal axis of the tray may extend from a proximal end to a distal end of the tray. The rotation of the tray may cause each vaporizer cartridge of the array of vaporizer cartridges to rotate 180 degrees about the central longitudinal axis of the tray. Additionally and/or alternatively, the rotation of the tray may cause each vaporizer cartridge of the array of vaporizer cartridges to rotate approximately 45 degrees to 90 degrees, 90 degrees to 135 degrees, 135 degrees to 180 degrees, 180 degrees to 225 degrees, 225 degrees to 270 degrees, 270 degrees to 315 degrees, 315 degrees to 360 degrees, 175 to 185 degrees, 179 to 181 degrees, 45 degrees, 90 degrees, 135 degrees, 180 degrees, 225 degrees, 270 degrees, 315 degrees, 360 degrees, and/or other ranges threrebetween, about the central longitudinal axis of the tray, to allow for the one or more operations to be performed on one or more sides of the cartridges in various orientations.

At 206, the machine, such as via the controller, may perform a second laser etching operation. For example, the machine (e.g., the laser) may laser etch a second set of cartridge data, such as the cartridge data described herein, onto the opposing second side of each vaporizer cartridge of the array of vaporizer cartridges. Additionally and/or alternatively, the machine may read the tag identifier and/or data stored on the tag to determine whether the tag is valid. The machine may perform the second laser operation on the vaporizer cartridge having a valid tag identifier (e.g., after determining that the tag identifier is valid) and/or may not perform the first laser operation if the machine determines that the tag identifier is not valid.

At 208, the machine, such as via the controller, may write a third set of cartridge data, such as the cartridge data described herein, from an antenna (e.g., the antenna 134) of the machine to the NFC tag of a corresponding vaporizer cartridge of the array of vaporizer cartridges. The cartridge data may be written to the NFC tag of each vaporizer cartridge before, during, and/or after the first laser etching operation and/or the second laser etching operation.

In various implementations, the vaporizer device may be configured for use with liquid vaporizable material (e.g., a carrier solution in which an active and/or inactive ingredient(s) are suspended or held in solution or a liquid form of the vaporizable material itself) or solid vaporizable material. Solid vaporizable material may include a plant material that emits some part of the plant material as the vaporizable material (e.g., such that some part of the plant material remains as waste after the vaporizable material is emitted for inhalation by a user) or optionally may be a solid form of the vaporizable material itself such that all of the solid material may eventually be vaporized for inhalation. Liquid vaporizable material may likewise be capable of being completely vaporized or may include some part of the liquid material that remains after all of the material suitable for inhalation has been consumed.

Additionally and/or alternatively, the vaporizable material may include liquid and/or oil-type plant-based smokeable materials such as *cannabis*, a semi-solid like a wax, solid/liquid (e.g., suspensions, liquid-coated) materials, and/or a solid material, such as plant material including loose-leaf materials, leaves or flowers, either raw or processed. The vaporizable material may additionally and/or alternatively include concentrates (e.g., *cannabis* concentrates including wax, shatter, budder, butane hash oil, and the like).

In some examples, the vaporizable material may include a viscous liquid such as, for example a *cannabis* oil. In some variations, the *cannabis* oil comprises between 0.3% and 100% *cannabis* oil extract. The viscous oil may include a carrier for improving vapor formation, such as, for example, propylene glycol, glycerol, medium chain triglycerides (MCT) including lauric acid, capric acid, caprylic acid, caproic acid, etc., at between 0.01% and 25% (e.g., between 0.1% and 22%, between 1% and 20%, between 1% and 15%, and/or the like). In some variations the vapor-forming carrier is 1,3-Propanediol. A *cannabis* oil may include a cannabinoid or cannabinoids (natural and/or synthetic), and/or a terpene or terpenes derived from organic materials such as for example fruits and flowers. For example, any of the vaporizable materials described herein may include one or more (e.g., a mixture of) cannabinoid including one or more of: CBG (Cannabigerol), CBC (Cannabichromene), CBL (Cannabicyclol), CBV (Cannabivarin), THCV (Tetrahydrocannabivarin), CBDV (Cannabidivarin), CBCV (Cannabichromevarin), CBGV (Cannabigerovarin), CBGM (Cannabigerol Monomethyl Ether), Tetrahydrocannabinol, Cannabidiol (CBD), Cannabinol (CBN), Tetrahydrocannabinolic Acid (THCA), Cannabidioloc Acid (CBDA), Tetrahydrocannabivarinic Acid (THCVA), one or more Endocannabinoids (e.g., anandamide, 2-Arachidonoylglycerol, 2-Arachidonyl glyceryl ether, N-Arachidonoyl dopamine, Virodhamine, Lysophosphatidylinositol), and/or a synthetic cannabinoids such as, for example, one or more of: JWH-018, JWH-073, CP-55940, Dimethylheptylpyran, HU-210, HU-331, SR144528, WIN 55,212-2, JWH-133, Levonantradol (Nantrodolum), and AM-2201. The oil vaporization material may include one or more terpene, such as, for example, Hemiterpenes, Monoterpenes (e.g., geraniol, terpineol, limonene, myrcene, linalool, pinene, Iridoids), Sesquiterpenes (e.g., humulene, famesenes, farnesol), Diterpenes (e.g., cafestol, kahweol, cembrene and taxadiene), Sesterterpenes, (e.g., geranylfarnesol), Triterpenes (e.g., squalene), Sesquarterpenes (e.g, ferrugicadiol and tetraprenylcurcumene), Tetraterpenes (lycopene, gamma-carotene, alpha- and beta-carotenes), Polyterpenes, and Norisoprenoids. For example, an oil vaporization material as described herein may include between 0.3-100% cannabinoids (e.g., 0.5-98%, 10-95%, 20-92%, 30-90%, 40-80%, 50-75%, 60-80%, etc.), 0-40% terpenes (e.g., 1-30%, 10-30%, 10-20%, etc.), and 0-25% carrier (e.g., medium chain triglycerides (MCT)).

In any of the oil vaporizable materials described herein (including in particular, the cannabinoid-based vaporizable materials), the viscosity may be within a predetermined range. The range may be between, at room temperature (23° C.) about 30 cP (centipoise) and 115 kcP (kilocentipoise), between 30 cP and 200 kcP, although higher viscosities and/or lower viscosities may be implemented as well. For example, the viscosity may be between 40 cP and 113 kcP at room temperature. Outside of this range, the vaporizable material may fail in some instances to wick appropriately to form a vapor as described herein. In particular, it is typically desired that the oil may be made sufficiently thin to both permit wicking at a rate that is useful with the apparatuses described herein, while also limiting leaking (e.g., viscosities below that of ~30 cP at room temperature might result in problems with leaking).

Although the disclosure, including the figures, described herein may described and/or exemplify these different variations separately, it should be understood that all or some, or components of them, may be combined.

Although various illustrative embodiments are described above, any of a number of changes may be made to various embodiments. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the claims.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. References to a structure or feature that is disposed "adjacent" another feature may have portions that overlap or underlie the adjacent feature.

Terminology used herein is for the purpose of describing particular embodiments only and is not intended to be limiting. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as, for example, "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings provided herein.

Throughout this specification and the claims which follow, unless the context requires otherwise, the word "comprise", and variations such as "comprises" and "comprising" means various components can be co jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" "or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, are possible.

In the descriptions above and in the claims, phrases such as, for example, "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A tray assembly for a machine configured for one or more of a laser etching operation and a tag writing operation, the tray assembly comprising:
    a tray configured to hold an array of vaporizer cartridges during one or more of the laser etching operation and the tag writing operation, the tray comprising:
        a first cartridge positioner;
        a second cartridge positioner rotatably coupled with the first cartridge positioner; and
        an array of cartridge retainers defined by the first cartridge positioner and the second cartridge positioner, wherein each cartridge retainer of the array of cartridge retainers comprises:
            a first opening formed through the first cartridge positioner, the first opening being configured to provide access to a first portion of a first side of a vaporizer cartridge of the array of vaporizer cartridges held within the tray; and
            a second opening formed through the second cartridge positioner, the second opening positioned opposite the first opening, the second opening being configured to provide access to a second portion of a second side of the vaporizer cartridge,
        wherein the tray is configured to be rotated 180 degrees about a central longitudinal axis of the tray that extends between a proximal end of the tray and a distal end of the tray, the rotation of the tray configured to cause each vaporizer cartridge of the array of vaporizer cartridges to rotate 180 degrees about the central longitudinal axis, and the rotation of the tray configured to allow for the first portion and the second portion of the vaporizer cartridge to be laser etched with cartridge data; and
    a nest configured to be coupled to and hold the tray during one or more of the laser etching operation and the tag writing operation, the nest comprising:
        a frame configured to support the tray, the frame comprising at least two side walls to position the tray within the nest; and
        an array of antennas, wherein each antenna of the array of antennas is configured to align with each cartridge retainer of the array of cartridge retainers, and wherein each antenna is configured to write the cartridge data to an NFC tag of each vaporizer cartridge of the array of vaporizer cartridges.

2. The tray assembly of claim 1, wherein the nest further comprises a circuit board and a mezzanine board coupled to the circuit board, and wherein the array of antennas is etched into the mezzanine board.

3. The tray assembly of claim 1, wherein the array of antennas is positioned beneath the tray.

4. The tray assembly of claim 1, wherein the frame further comprises a cover, the cover positioned over the array of antennas.

5. The tray assembly of claim 1, wherein the nest comprises at least one magnet to magnetically secure the tray to the nest.

6. The tray assembly of claim 1, wherein the array of vaporizer cartridges comprises at least five rows of vaporizer cartridges and at least five columns of vaporizer cartridges.

7. The tray assembly of claim 1, wherein the first opening and the second opening each form a boundary around the first portion and the second portion to be laser etched with the cartridge data.

8. The tray assembly of claim 1, wherein the cartridge data includes vaporizable material information relating to a vaporizable material stored within each vaporizer cartridge of the array of vaporizer cartridges.

9. A machine, comprising:
the tray assembly of claim 1;
a laser configured to laser etch one or more of the first portion of each vaporizer cartridge of the array of vaporizer cartridges and the second portion of each vaporizer cartridge of the array of vaporizer cartridges; and
a controller, the controller comprising at least one data processor and at least one memory storing instructions, which when executed by the at least one data processor, result in operations comprising:
performing, by the machine, a first laser etching operation, the first laser etching operation comprising: laser etching a first set of cartridge data onto the first portion of each vaporizer cartridge of the array of vaporizer cartridges;
rotating the tray 180 degrees about the central longitudinal axis of the tray to provide access to the second portion of the vaporizer cartridge, the rotation of the tray configured to cause each vaporizer cartridge of the array of vaporizer cartridges to rotate 180 degrees about the central longitudinal axis of the tray;
performing, by the machine, a second laser etching operation, the second laser etching operation comprising: laser etching a second set of cartridge data onto the second portion of each vaporizer cartridge of the array of vaporizer cartridges; and
writing, by the machine, a third set of cartridge data to the NFC tag of each vaporizer cartridge of the array of vaporizer cartridges.

10. The machine of claim 9, wherein the writing the third set of cartridge data is performed during one or more of the first laser etching operation and the second laser etching operation.

11. The machine of claim 9, wherein the writing the third set of cartridge data is performed before rotation of the tray.

12. The machine of claim 9, wherein the writing the third set of cartridge data is performed after rotation of the tray.

13. The machine of claim 9, wherein the first set of cartridge data and the second set of cartridge data include vaporizable material information relating to a vaporizable material stored within each vaporizer cartridge of the array of vaporizer cartridges.

14. The machine of claim 9, wherein the third set of cartridge data comprises one or more of manufacturing data, manufacturing test data, manufacturing test parameters, material logging, filler data, vaporizable material data, and usage data.

15. The machine of claim 9, wherein the first set of cartridge data is laser etched onto the first portion of each vaporizer cartridge of the array of vaporizer cartridges in a sequence, the sequence comprising sequentially laser etching each of the vaporizer cartridges held in the tray in an order indicated by a positional indicator on the tray.

16. The machine of claim 9, wherein the second set of cartridge data is laser etched onto the second portion of each vaporizer cartridge of the array of vaporizer cartridges in a sequence, the sequence comprising sequentially laser etching each of the vaporizer cartridges held in the tray in an order indicated by a positional indicator on the tray.

17. A method, comprising:
performing, by a machine, a first laser etching operation, the first laser etching operation by at least comprising: laser etching a first set of cartridge data onto a first side of each vaporizer cartridge of an array of vaporizer cartridges, the array of vaporizer cartridges held within a tray, the tray enclosing the array of vaporizer cartridges, wherein each vaporizer cartridge comprises an NFC tag;
rotating the tray 180 degrees about a central longitudinal axis of the tray to provide access to an opposing second side of each vaporizer cartridge, the central longitudinal axis of the tray extending from a proximal end to a distal end of the tray, the rotation of the tray being configured to cause each vaporizer cartridge of the array of vaporizer cartridges to rotate 180 degrees about the central longitudinal axis of the tray;
performing, by the machine, a second laser etching operation, the second laser etching operation by at least comprising: laser etching a second set of cartridge data onto the opposing second side of each vaporizer cartridge of the array of vaporizer cartridges; and
writing, by the machine, a third set of cartridge data from an antenna to the NFC tag of a corresponding vaporizer cartridge of the array of vaporizer cartridges.

18. The method of claim 17, wherein the writing the third set of cartridge data is performed during one or more of the first laser etching operation and the second laser etching operation.

19. The method of claim 17, wherein the first set of cartridge data and the second set of cartridge data include vaporizable material information relating to a vaporizable material stored within each vaporizer cartridge of the array of vaporizer cartridges; and wherein the third set of cartridge data comprises one or more of manufacturing data, manufacturing test data, manufacturing test parameters, material logging, filler data, vaporizable material data, and usage data.

20. A machine, comprising:
a tray assembly configured for one or more of a laser etching operation and a tag writing operation, the tray assembly comprising: a tray configured to hold an array of vaporizer cartridges during one or more of the laser etching operation and the tag writing operation, the tray comprising:

a first cartridge positioner;
a second cartridge positioner rotatably coupled with the first cartridge positioner; and
an array of cartridge retainers defined by the first cartridge positioner and the second cartridge positioner, wherein each cartridge retainer of the array of cartridge retainers comprises:
  a first opening formed through the first cartridge positioner, the first opening being configured to provide access to a first portion of a first side of a vaporizer cartridge of the array of vaporizer cartridges held within the tray; and
  a second opening formed through the second cartridge positioner, the second opening positioned opposite the first opening, the second opening being configured to provide access to a second portion of a second side of the vaporizer cartridge,
wherein the tray is configured to be rotated 180 degrees about a central longitudinal axis of the tray that extends between a proximal end of the tray and a distal end of the tray, the rotation of the tray configured to cause each vaporizer cartridge of the array of vaporizer cartridges to rotate 180 degrees about the central longitudinal axis, and the rotation of the tray configured to allow for the first portion and the second portion of the vaporizer cartridge to be laser etched with cartridge data;
a laser configured to laser etch one or more of the first portion of each vaporizer cartridge of the array of vaporizer cartridges and the second portion of each vaporizer cartridge of the array of vaporizer cartridges;
an array of antennas, wherein each antenna of the array of antennas is configured to write the cartridge data to an NFC tag of each vaporizer cartridge of the array of vaporizer cartridges; and
a controller, the controller comprising at least one data processor and at least one memory storing instructions, which when executed by the at least one data processor, result in operations comprising:
  performing, by the machine, a first laser etching operation, the first laser etching operation comprising: laser etching a first set of cartridge data onto the first portion of each vaporizer cartridge of the array of vaporizer cartridges;
  rotating the tray 180 degrees about the central longitudinal axis of the tray to provide access to the second portion of the vaporizer cartridge, the rotation of the tray configured to cause each vaporizer cartridge of the array of vaporizer cartridges to rotate 180 degrees about the central longitudinal axis of the tray;
  performing, by the machine, a second laser etching operation, the second laser etching operation comprising: laser etching a second set of cartridge data onto the second portion of each vaporizer cartridge of the array of vaporizer cartridges; and
  writing, by the machine, a third set of cartridge data to the NFC tag of each vaporizer cartridge of the array of vaporizer cartridges.

* * * * *